(12) United States Patent
Haider et al.

(10) Patent No.: US 12,574,796 B2
(45) Date of Patent: *Mar. 10, 2026

(54) SYSTEMS AND METHODS OF REPORTING BUFFER STATUS FOR WIRELESS PEER-TO-PEER (P2P) TRAFFIC

(71) Applicant: Meta Platforms Technologies, LLC, Menlo Park, CA (US)

(72) Inventors: Muhammad Kumail Haider, Sunnyvale, CA (US); Chunyu Hu, Saratoga, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 325 days.

This patent is subject to a terminal disclaimer.

(21) Appl. No.: 18/124,782

(22) Filed: Mar. 22, 2023

(65) Prior Publication Data

US 2023/0345300 A1      Oct. 26, 2023

Related U.S. Application Data

(60) Provisional application No. 63/333,872, filed on Apr. 22, 2022, provisional application No. 63/333,822, filed on Apr. 22, 2022.

(51) Int. Cl.
*H04W 28/02*      (2009.01)
*H04W 84/12*      (2009.01)

(52) U.S. Cl.
CPC ... *H04W 28/0278* (2013.01); *H04W 28/0268* (2013.01); *H04W 84/12* (2013.01)

(58) Field of Classification Search
CPC ......... H04W 28/0278; H04W 28/0268; H04W 84/12; H04W 1/1614; H04W 52/0206; H04W 74/006; H04W 76/14; Y02D 30/70
See application file for complete search history.

(56) References Cited

U.S. PATENT DOCUMENTS

| | | | |
|---|---|---|---|
| 2017/0332385 A1 | 11/2017 | Shirali et al. | |
| 2018/0124746 A1* | 5/2018 | Choi | H04L 5/0023 |
| 2021/0076251 A1* | 3/2021 | Ho | H04L 65/80 |
| 2021/0112626 A1 | 4/2021 | Yi et al. | |

(Continued)

FOREIGN PATENT DOCUMENTS

| | | | |
|---|---|---|---|
| GB | 2575329 | * | 1/2020 |
| GB | 2575329 A | | 1/2020 |
| WO | 2022013437 A1 | | 1/2022 |

OTHER PUBLICATIONS

International Search Report and Written Opinion for International Application No. PCT/US2023/019517, mailed Jul. 4, 2023, 9 pages.

(Continued)

*Primary Examiner* — Mewale A Ambaye
(74) *Attorney, Agent, or Firm* — Foley & Lardner LLP

(57) ABSTRACT

A first device may include one or more processors. The one or more processors may be configured to generate a first frame including buffer status data corresponding to wireless traffic between the first device and a second device. Each of the first device and the second device may not be an access point. The one or more processors may be configured to wirelessly transmit, via a transceiver, the generated first frame to an access point in a wireless local area network (WLAN).

18 Claims, 17 Drawing Sheets

1400

Generating, by a first device, a first frame including buffer status data corresponding to wireless traffic between the first device and a second device. Each of the first device and the second device may not be an access point 1402

Wirelessly transmitting, via a transceiver of the first device, the generated first frame to an access point in a wireless local area network (WLAN) 1404

(56)               References Cited

U.S. PATENT DOCUMENTS

| | | |
|---|---|---|
| 2021/0195460 A1 | 6/2021 | Park et al. |
| 2022/0053560 A1* | 2/2022 | Xin .................... H04W 74/0816 |
| 2023/0337050 A1* | 10/2023 | Guignard .............. H04W 72/12 |
| 2023/0403704 A1* | 12/2023 | Park ...................... H04W 72/23 |
| 2024/0007846 A1* | 1/2024 | Kneckt ............. H04W 52/0258 |
| 2024/0137860 A1* | 4/2024 | Asterjadhi ........ H04W 52/0206 |

OTHER PUBLICATIONS

International Search Report and Written Opinion for International Application No. PCT/US2023/019507, mailed Jul. 5, 2023, 9 pages.

* cited by examiner

Trigger Type Subfield Encoding 590

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

Trigger Type Subfield Encoding 800

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| N (8≤N ≤15) | BSRP-p2p |

Generating, by an access point, a first frame to trigger a receiver device to send a response frame that comprises buffer status data corresponding to wireless traffic between the receiver device and another device 902

Wirelessly transmitting, via a transmitter of the access point, the generated first frame to one or more devices 906

QoS Control Field Format 1000

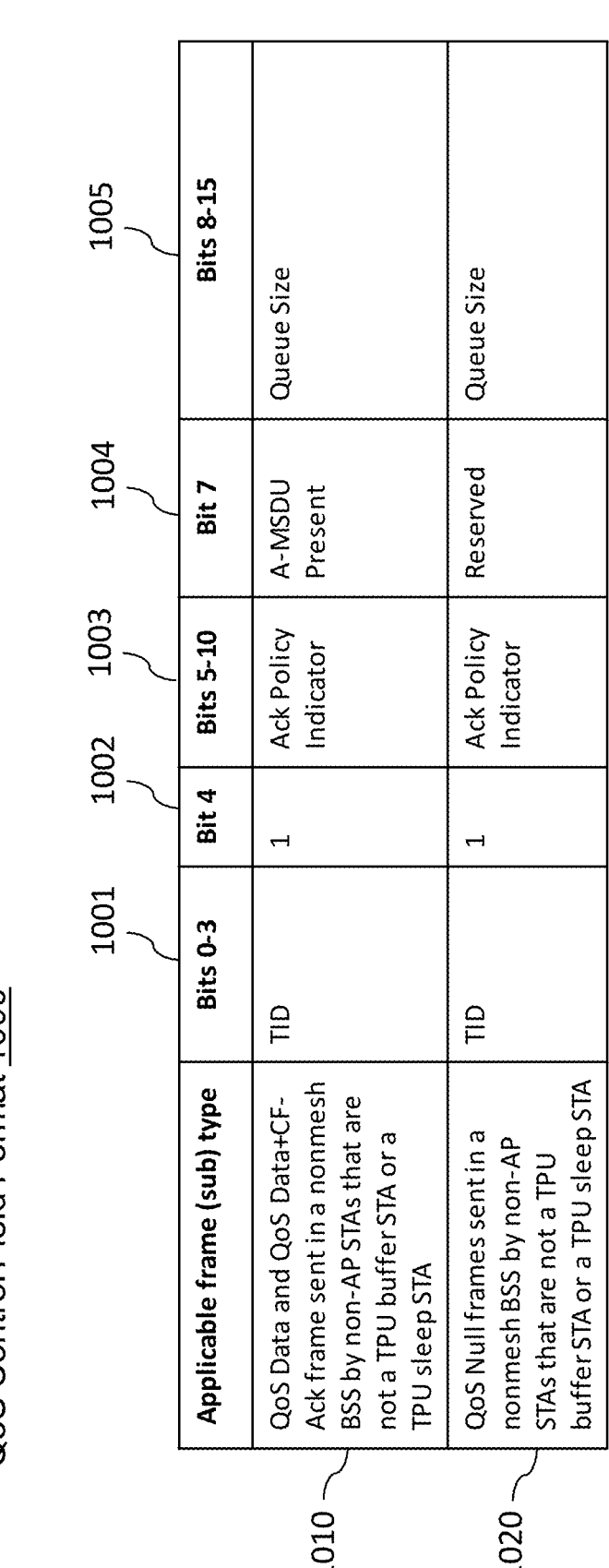

| Applicable frame (sub) type | Bits 0-3 | Bit 4 | Bits 5-10 | Bit 7 | Bits 8-15 |
|---|---|---|---|---|---|
| | 1001 | 1002 | 1002 1003 | 1004 | 1005 |
| QoS Data and QoS Data+CF-Ack frame sent in a nonmesh BSS by non-AP STAs that are not a TPU buffer STA or a TPU sleep STA | TID | 1 | Ack Policy Indicator | A-MSDU Present | Queue Size |
| QoS Null frames sent in a nonmesh BSS by non-AP STAs that are not a TPU buffer STA or a TPU sleep STA | TID | 1 | Ack Policy Indicator | Reserved | Queue Size |

QoS Control Field Format 1200

| Applicable frame (sub) type | Bits 0-3 | Bit 4 | Bits 5-6 | Bit 7 | Bits 8-15 |
|---|---|---|---|---|---|
| QoS Null frames sent in a nonmesh BSS by non-AP STAs that are not a TPU buffer STA or a TPU sleep STA | TID | 0 | Ack Policy Indicator | Reserved | TXOP Duration Requested |
| | TID | 1 | Ack Policy Indicator | 0 | Queue Size (UL) |
| | Reserved | 1 | Reserved | 1 | Queue Size (p2p) |

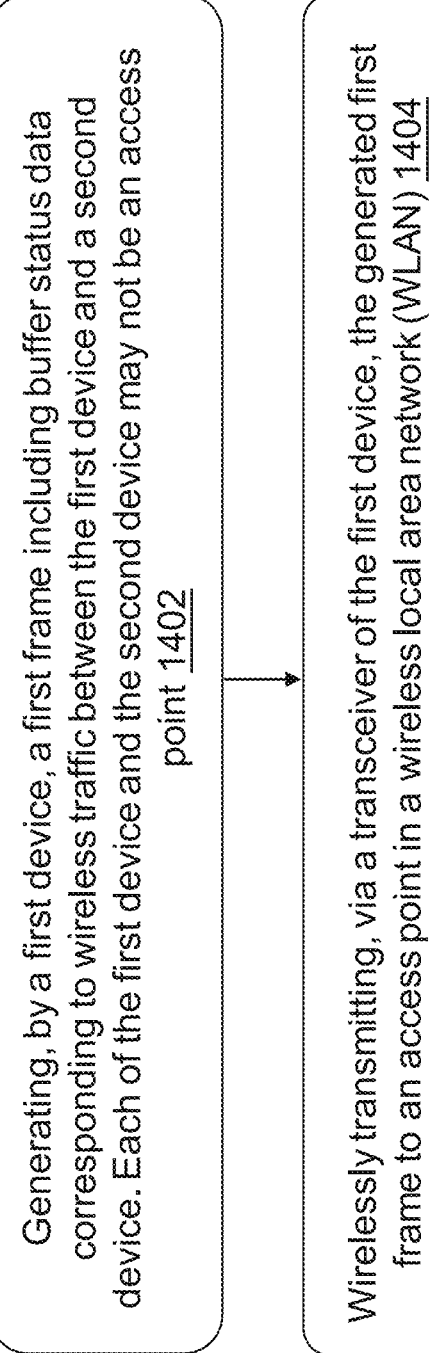

1400

Generating, by a first device, a first frame including buffer status data corresponding to wireless traffic between the first device and a second device. Each of the first device and the second device may not be an access point 1402

Wirelessly transmitting, via a transceiver of the first device, the generated first frame to an access point in a wireless local area network (WLAN) 1404

FIG. 14

SYSTEMS AND METHODS OF REPORTING BUFFER STATUS FOR WIRELESS PEER-TO-PEER (P2P) TRAFFIC

CROSS-REFERENCE TO RELATED APPLICATION

This application claims priority to U.S. Provisional Patent Application No. 63/333,822 filed on Apr. 22, 2022, which is incorporated by reference herein in its entirety for all purposes. This application also claims priority to U.S. Provisional Patent Application No. 63/333,872 filed on Apr. 22, 2022, which is incorporated by reference herein in its entirety for all purposes.

FIELD OF DISCLOSURE

The present disclosure is generally related to communications, including but not limited systems and methods for a wireless device (STA) to report buffer status of its peer-to-peer (p2p) traffic, e.g., to improve resource allocation.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). An image of a virtual object may be generated by a console communicatively coupled to the HWD. In some embodiments, the console may have access to a network.

SUMMARY

Various embodiments disclosed herein are related to a first device including one or more processors. In some embodiments, the one or more processors may be configured to generate a first frame including buffer status data corresponding to wireless traffic between the first device and a second device. Each of the first device and the second device may not be an access point. The one or more processors may be configured to wirelessly transmit, via a transceiver, the generated first frame to an access point in a wireless local area network (WLAN).

In some embodiments, the one or more processors may be further configured to wirelessly receive, via the transceiver from the access point, a second frame. In response to the second frame, the one or more processors may be configured to generate the first frame. In some embodiments, the wireless traffic may include peer-to-peer (p2p) traffic between the first device and the second device. In some embodiments, the first frame may include a control identifier field. In generating the first frame, the one or more processors may be configured to set the control identifier field to a value indicating a buffer status report frame.

In some embodiments, the first frame may include a bitmap field that includes a plurality of bits corresponding to a plurality of access categories. In generating the first frame, the one or more processors may be configured to set each of the plurality of bits to a first value indicating that there is no traffic associated with an access category corresponding to the bit. In some embodiments, the first frame may include a number of traffic identifiers field indicating a number of traffic identifiers for which there is buffered traffic. In generating the first frame, the one or more processors may be configured to set the number of traffic identifiers field to a second value indicating that the number of traffic identifiers for which there is buffered traffic is zero.

In some embodiments, the first frame may include a quality of service (QoS) control field that includes a first field. In generating the first frame, the one or more processors may be configured to set the first field to a value indicating presence of wireless peer-to-peer (p2p) traffic. The QoS control field includes a second field. In generating the first frame, the one or more processors may be configured to set the second field to a value indicating a queue size of the wireless traffic between the first device and the second device.

In some embodiments, the first frame may include a control identifier field. In generating the first frame, the one or more processors may be configured to set the control identifier field to a value indicating a peer-to-peer (p2p) buffer status report frame. The first frame may include a queue size field. In generating the first frame, the one or more processors may be configured to set the queue size field to a value indicating a queue size of the wireless traffic between the first device and a second device.

Various embodiments disclosed herein are related to a method including generating, by a first device, a first frame including buffer status data corresponding to wireless traffic between the first device and a second device. Each of the first device and the second device may not be an access point. The method may include wirelessly transmitting, via a transceiver of the first device, the generated first frame to an access point in a wireless local area network (WLAN).

In some embodiments, the first device may wirelessly receive, via the transceiver from the access point, a second frame. In response to the second frame, the first device may generate the first frame. In some embodiments, the wireless traffic may include peer-to-peer (p2p) traffic between the first device and the second device. In some embodiments, the first frame may include a control identifier field. In generating the first frame, the first device may set the control identifier field to a value indicating a buffer status report frame.

In some embodiments, the first frame may include a bitmap field that includes a plurality of bits corresponding to a plurality of access categories. In generating the first frame, the first device may set each of the plurality of bits to a first value indicating that there is no traffic associated with an access category corresponding to the bit. The first frame may include a number of traffic identifiers field indicating a number of traffic identifiers for which there is buffered traffic. In generating the first frame, the first device may set the number of traffic identifiers field to a second value indicating that the number of traffic identifiers for which there is buffered traffic is zero.

In some embodiments, the first frame may include a quality of service (QoS) control field that includes a first field. In generating the first frame, the first device may set the first field to a value indicating presence of wireless peer-to-peer (p2p) traffic. The QoS control field includes a second field. In generating the first frame, the first device may set the second field to a value indicating a queue size of the wireless traffic between the first device and the second device.

In some embodiments, the first frame may include a control identifier field. In generating the first frame, the first device may set the control identifier field to a value indicating a peer-to-peer (p2p) buffer status report frame. The first frame may include a queue size field. In generating the first frame, the first device may set the queue size field to a value indicating a queue size of the wireless traffic between the first device and a second device.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 5D illustrates an example trigger type subfield encoding, according to an example implementation of the present disclosure.

FIG. 8 illustrates an example trigger type subfield encoding for indicating a BSR trigger frame for p2p traffic, according to an example implementation of the present disclosure.

FIG. 10A illustrates an example quality of service (QoS) control field format, according to an example implementation of the present disclosure.

FIG. 12 illustrates an example QoS control field format for reporting buffer status for p2p traffic, according to an example implementation of the present disclosure.

FIG. 14 is a flowchart showing a process of reporting buffer status for p2p traffic, according to an example implementation of the present disclosure.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
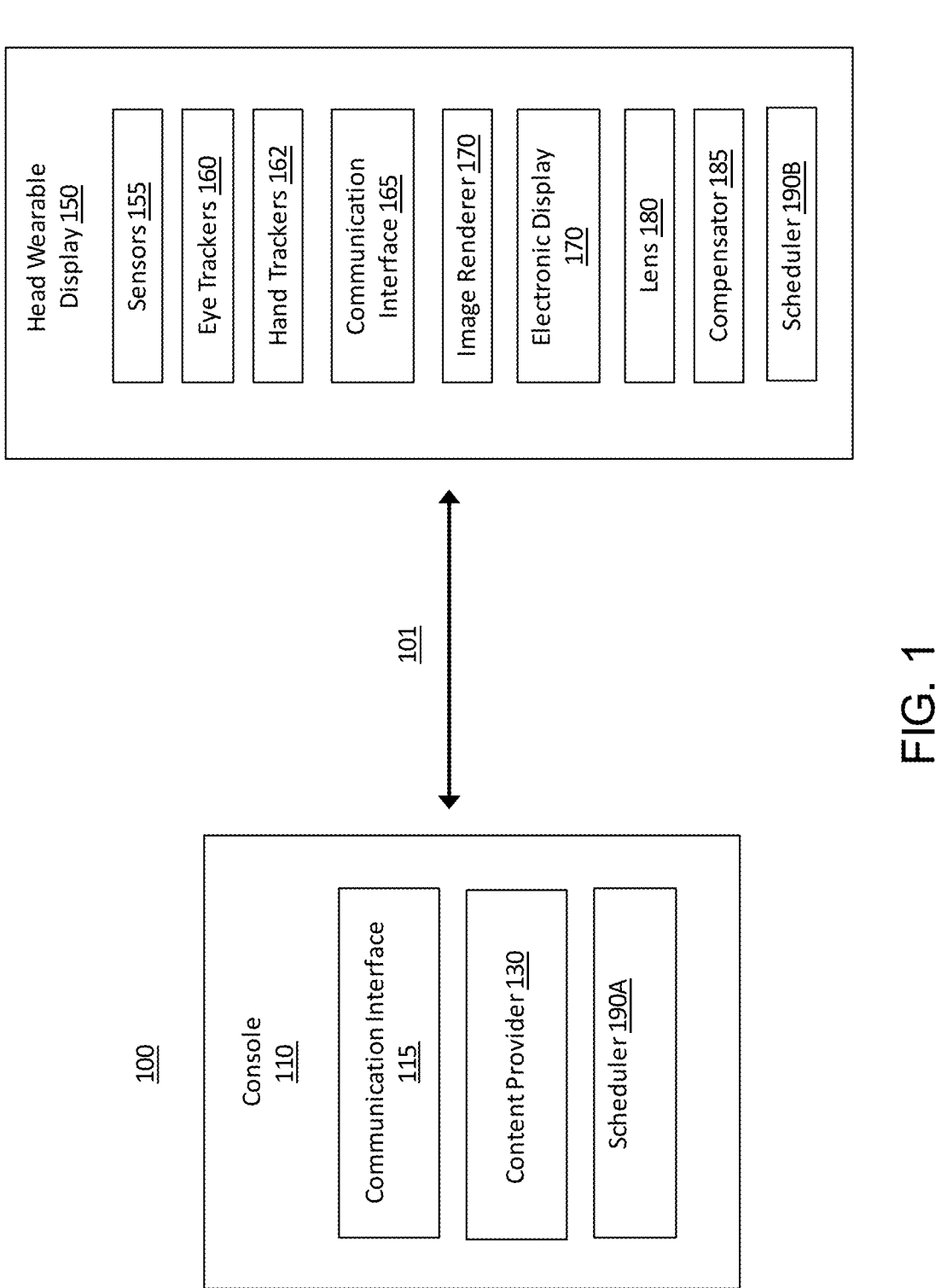
FIG. 1 is a diagram of a system environment including an artificial reality system, according to an example implementation of the present disclosure.

FIG. 1 is a block diagram of an example artificial reality system environment 100 in which a console 110 operates. FIG. 1 provides an example environment in which devices may communicate traffic streams with different latency sensitivities/requirements. In some embodiments, the artificial reality system environment 100 includes a HWD 150 worn by a user, and a console 110 providing content of artificial reality to the HWD 150. A head wearable display (HWD) may be referred to as, include, or be part of a head mounted display (HMD), head mounted device (HMD), head wearable device (HWD), head worn display (HWD) or head worn device (HWD). In one aspect, the HWD 150 may include various sensors to detect a location, an orientation, and/or a gaze direction of the user wearing the HWD 150, and provide the detected location, orientation and/or gaze direction to the console 110 through a wired or wireless connection. The HWD 150 may also identify objects (e.g., body, hand face).

The console 110 may determine a view within the space of the artificial reality corresponding to the detected location, orientation and/or the gaze direction, and generate an image depicting the determined view. The console 110 may also receive one or more user inputs and modify the image according to the user inputs. The console 110 may provide the image to the HWD 150 for rendering. The image of the space of the artificial reality corresponding to the user's view can be presented to the user. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150, and/or some of the functionality of the HWD 150 may be performed by the console 110.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a communication interface 165, an image renderer 170, an electronic display 175, a lens 180, and a compensator 185. These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and/or an orientation of the HWD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and location of the HWD 150. In one aspect, the sensors 155 can detect the translational movement and/or the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and/or an orientation of the hand. The hand tracker 162 may generate hand tracking measurements indicating the detected shape, location and/or orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In embodiments in which the console 110 and the head wearable display 150 are implemented on a single system, the communication interface 165 may communicate with the console 110 through a bus connection or a conductive trace. Through the communication link, the communication interface 165 may transmit to the console 110 sensor measurements indicating the determined location of the HWD 150, orientation of the HWD 150, the determined gaze direction of the user, and/or hand tracking measurements. Moreover, through the communication link, the communication interface 165 may receive from the console 110 sensor measurements indicating or corresponding to an image to be rendered.

Using the communication interface, the console 110 (or HWD 150) may coordinate operations on link 101 to reduce collisions or interferences. For example, the console 110 may coordinate communication between the console 110 and the HWD 150. In some implementations, the console 110 may transmit a beacon frame periodically to announce/advertise a presence of a wireless link between the console 110 and the HWD 150 (or between two HWDs). In an implementation, the HWD 150 may monitor for or receive the beacon frame from the console 110, and can schedule communication with the HWD 150 (e.g., using the information in the beacon frame, such as an offset value) to avoid collision or interference with communication between the console 110 and/or HWD 150 and other devices.

The console 110 and HWD 150 may communicate using link 101 (e.g., intralink). Data (e.g., a traffic stream) may flow in a direction on link 101. For example, the console 110 may communicate using a downlink (DL) communication to the HWD 150 and the HWD 150 may communicate using an uplink (UL) communication to the console 110.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 110 may be encoded, and the image renderer 170 may decode the data to generate and render the image. In one aspect, the image renderer 170 receives the encoded image from the console 110, and decodes the encoded image, such that a communication bandwidth between the console 110 and the HWD 150 can be reduced.

In some embodiments, the image renderer 170 receives, from the console, 110 additional data including object information indicating virtual objects in the artificial reality space and depth information indicating depth (or distances from the HWD 150) of the virtual objects. Accordingly, the image renderer 170 may receive from the console 110 object information and/or depth information. The image renderer 170 may also receive updated sensor measurements from the sensors 155. The process of detecting, by the HWD 150, the location and the orientation of the HWD 150 and/or the gaze direction of the user wearing the HWD 150, and generating and transmitting, by the console 110, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms).

In some implementations, the image renderer 170 may perform shading, reprojection, and/or blending to update the image of the artificial reality to correspond to the updated location and/or orientation of the HWD 150. Assuming that a user rotated their head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality.

In other implementations, the image renderer 170 generates one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a field of view (FOV) of the user) of the artificial reality corresponding to the location of the HWD 150 and/or the gaze direction of the user of the HWD 150, and can generate an image of the artificial reality corresponding to the determined view. In other embodiments, the console 110 includes more, fewer, or different components than shown in FIG. 1. In some embodiments, the console 110 is integrated as part of the HWD 150. In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., USB cable, a wireless link). Through the communication link, the communication interface 115 may receive from the HWD 150 sensor measurements indicating the determined location and/or orientation of the HWD 150, the determined gaze direction of the user, and/or hand tracking measurements. Moreover, through the communication link, the communication interface 115 may transmit to the HWD 150 data describing an image to be rendered.

The content provider 130 can include or correspond to a component that generates content to be rendered according to the location and/or orientation of the HWD 150, the gaze direction of the user and/or hand tracking measurements. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space.

The content provider 130 may generate image data describing an image of the determined view of the artificial reality space, and transmit the image data to the HWD 150 through the communication interface 115. The content provider may also generate a hand model (or other virtual object) corresponding to a hand of the user according to the hand tracking measurement, and generate hand model data indicating a shape, a location, and an orientation of the hand model in the artificial reality space.

In some embodiments, the content provider 130 generates metadata including motion vector information, depth information, edge information, object information, etc., associated with the image, and transmits the metadata with the image data to the HWD 150 through the communication interface 115. The content provider 130 may encode and/or encode the data describing the image, and can transmit the encoded and/or encoded data to the HWD 150. In some embodiments, the content provider 130 generates and provides the image to the HWD 150 periodically (e.g., every one second).

Figure 2:
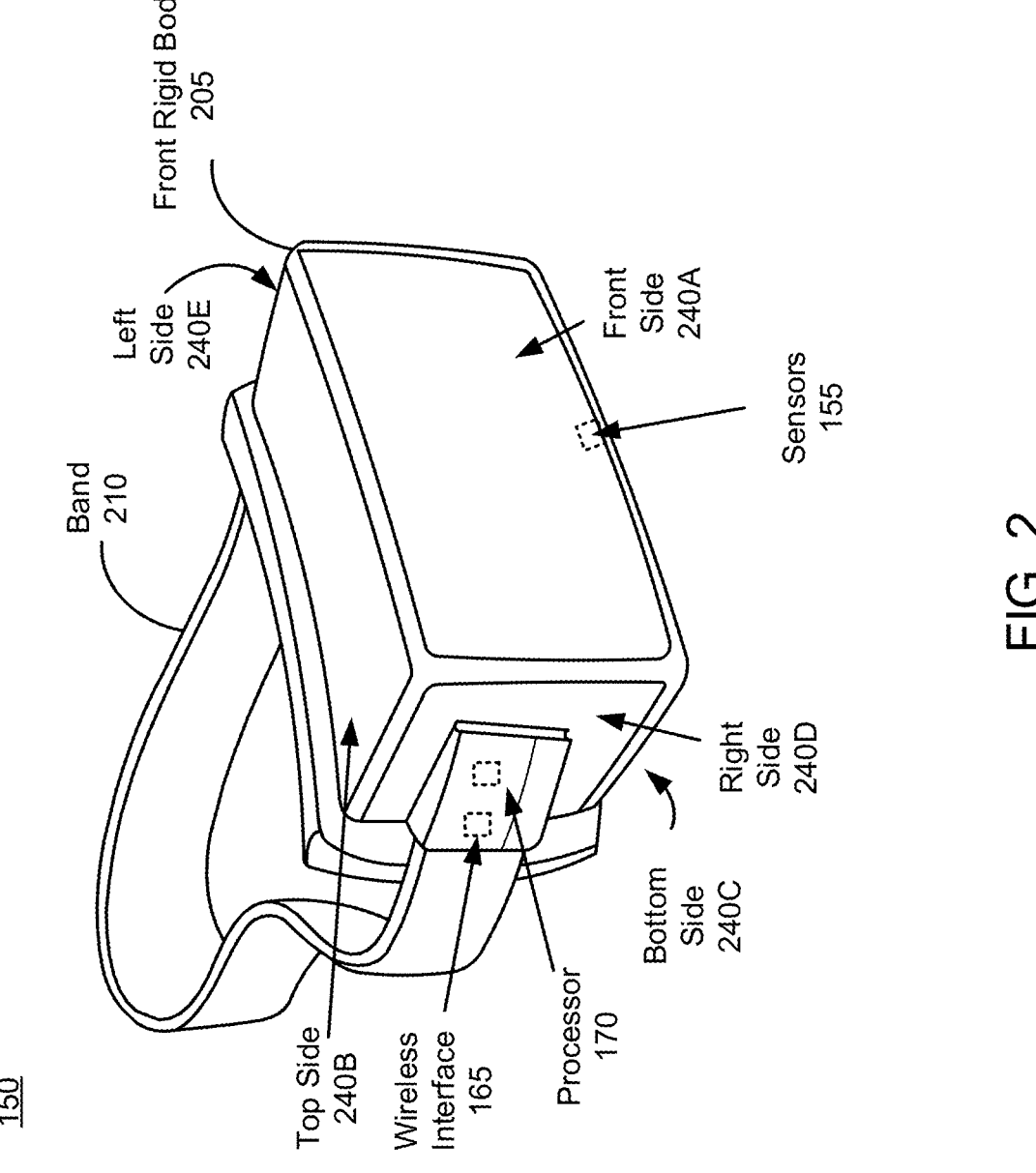
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the sensors 155 are located within the front rigid body 205, and may not visible to the user. In other embodiments, the HWD 150 has a different configuration than shown in FIG. 2. For example, the image renderer 170, the eye trackers 160A, 160B, and/or the sensors 155 may be in different locations than shown in FIG. 2.

Figure 3:
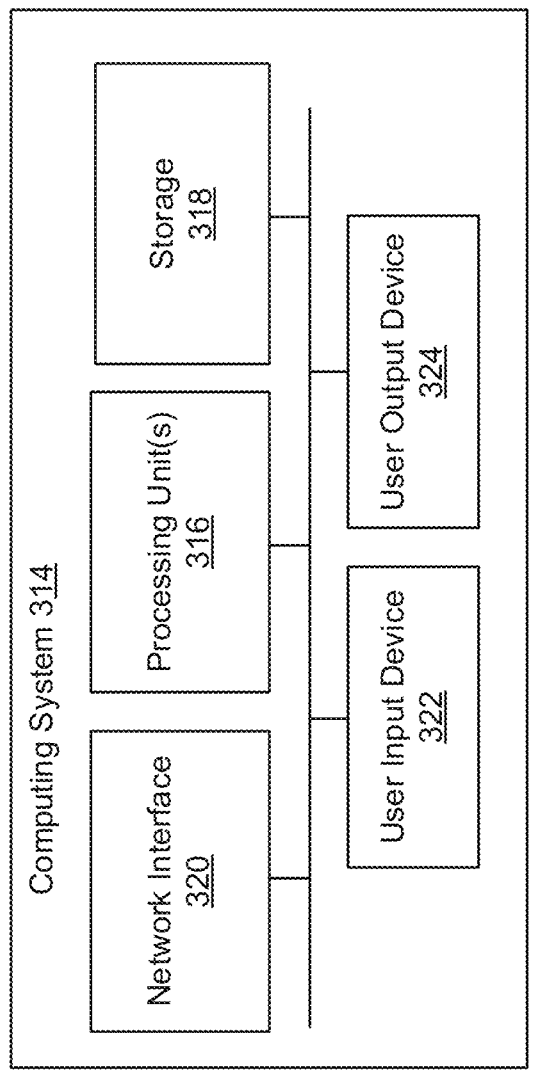
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 320 may include a transceiver to allow the computing system 314 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 316. Similarly, a receiver may be configured to receive frames, slots or symbols and the processor unit 316 may be configured to process the frames. For example, the processor unit 316 can be configured to determine a type of frame and to process the frame and/or fields of the frame accordingly.

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

1. Requesting Buffer Status Report for Wireless Peer-to-Peer (p2p) Traffic

IEEE 802.11be Extremely High Throughput (EHT) may be the next generation 802.11 IEEE standard, which may be designated Wi-Fi 7. A signaling method for requesting/ polling buffer status report (BSR) may be defined, in accordance with some embodiments of the present disclosure. A BSR operation may be performed as follows. An AP may send a trigger frame (e.g., Buffer Status Report Poll (BSRP) Trigger frame) to STAs to enquire about buffer status. Buffer status may be a quantitative indication of how much traffic (e.g., quality of service (QoS) data) is queued up at a STA. The STA may indicate a buffer status in a data unit (e.g., bytes) by including either of a QoS control field or a BSR control field in frames sent to the AP. The STA may indicate a buffer status in response to a BSRP trigger frame or as an unsolicited response by itself.

Figures 4A, 4B:
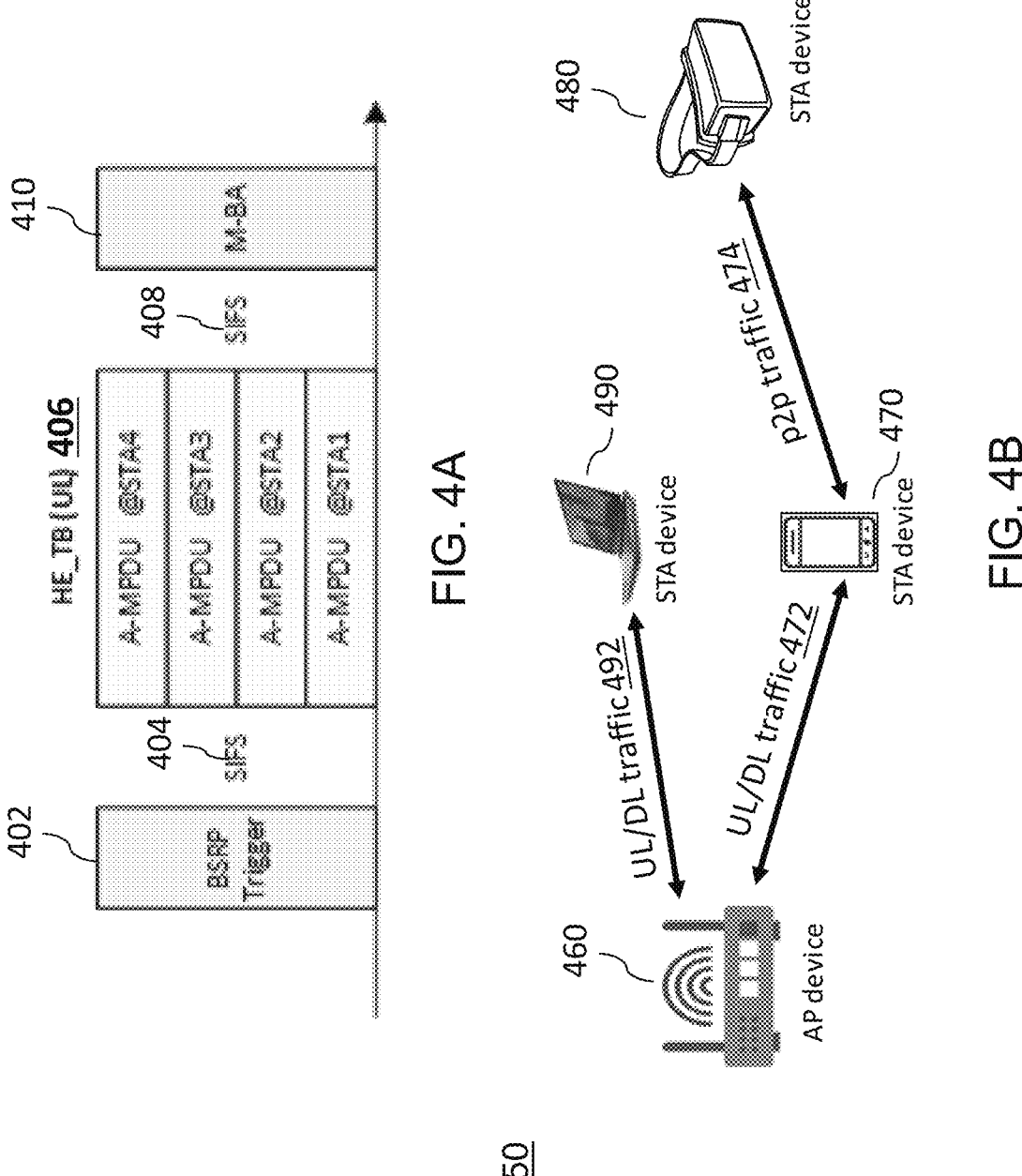
FIG. 4A is a diagram of a buffer status report (BSR) request and BSR responses, according to an example implementation of the present disclosure.
FIG. 4B is a diagram of a system environment including peer-to-peer (p2p) traffic in a wireless local area network (WLAN), according to an example implementation of the present disclosure.

FIG. 4A is a diagram 400 of a buffer status report (BSR) request (e.g., BSRP trigger frame 402) and BSR responses (e.g., high-efficiency (HE) trigger-based (TB) uplink (UL) aggregate MAC Protocol Data Unit (A-MPDU) frames 406), according to an example implementation of the present disclosure. As shown in FIG. 4, an AP can send the BSRP trigger frame 402. After a short inter-frame space (SIFS) 404, STAs (e.g., STA1-STA4) can send their buffer statuses respectively contained in HE TB ULA-MPDU frames 406, which may be acknowledged by a multi-STA block Acknowledgment (M-BA) frame 410 after another SIFS 408. A buffer status can be contained in either a QoS-control field or a BSR HE control field in a QoS-Data frame or a QoS-Null frame. A STA may or may not acknowledge (ACK) a BSR request.

FIG. 4B is a diagram of a system environment including peer-to-peer (p2p) traffic in a wireless local area network (WLAN), according to an example implementation of the present disclosure. A first non-AP STA device 470 may be configured to send/receive UL/DL (downlink) traffic 472 to/from an AP device 460, and may be configured to send/receive p2p traffic 474 to/from a second non-AP device 480. A third non-AP STA device 490 may be configured to send/receive UL/DL traffic 492 to/from the AP device 460.

Figure 5A:
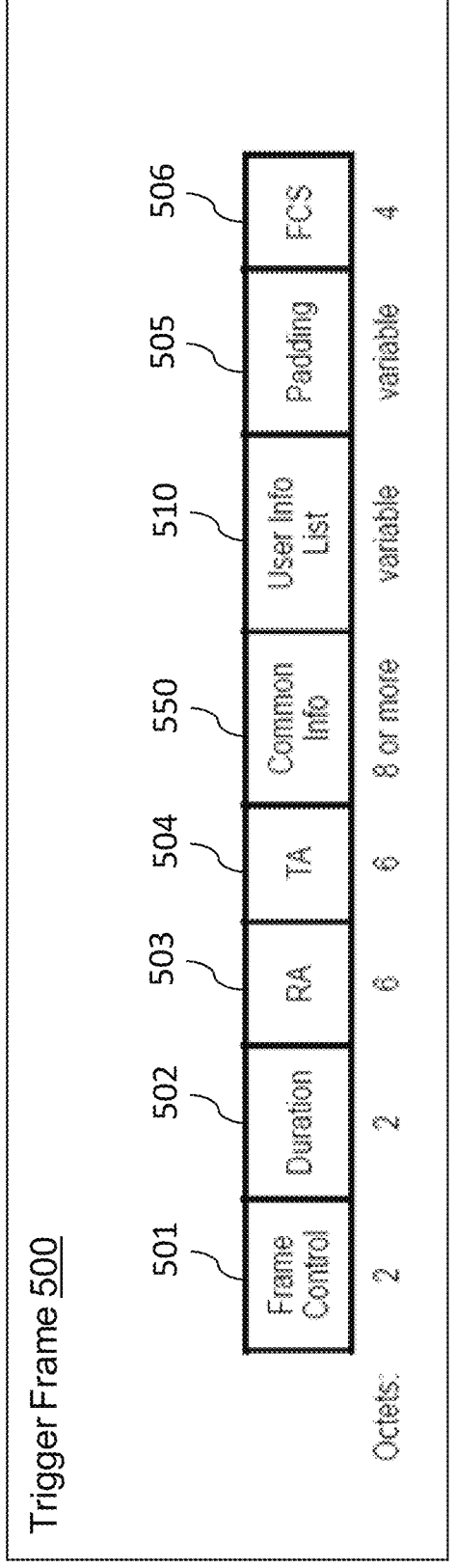
FIG. 5A, FIG. 5B and FIG. 5C illustrate an example buffer status report poll (BSRP) trigger frame format, according to an example implementation of the present disclosure.
Figure 5B:
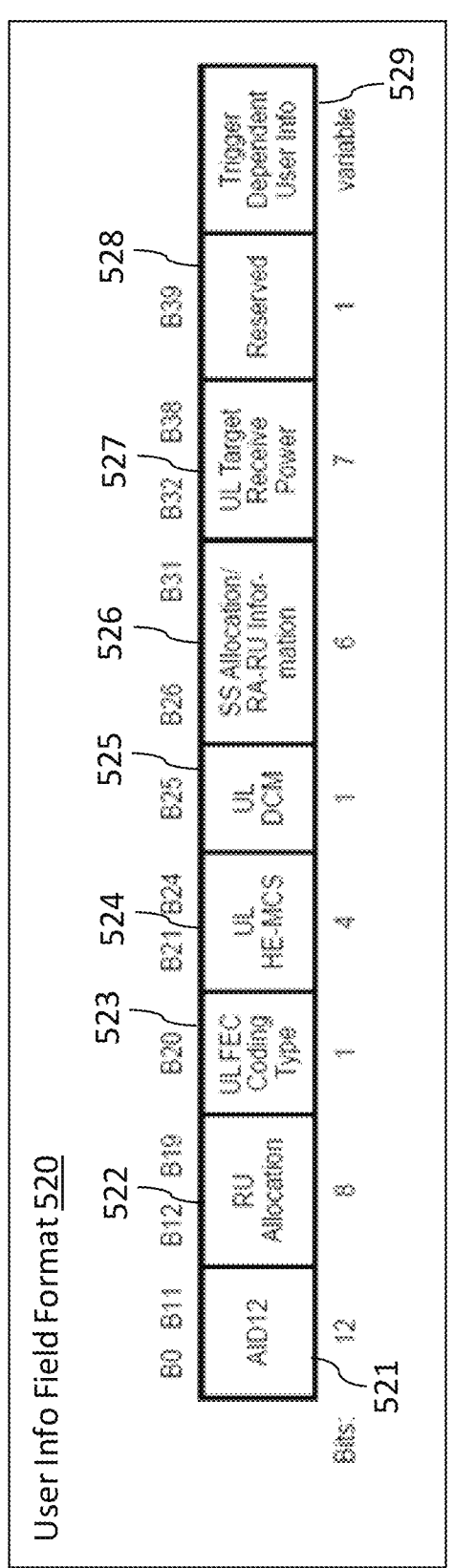
Figure 5C:
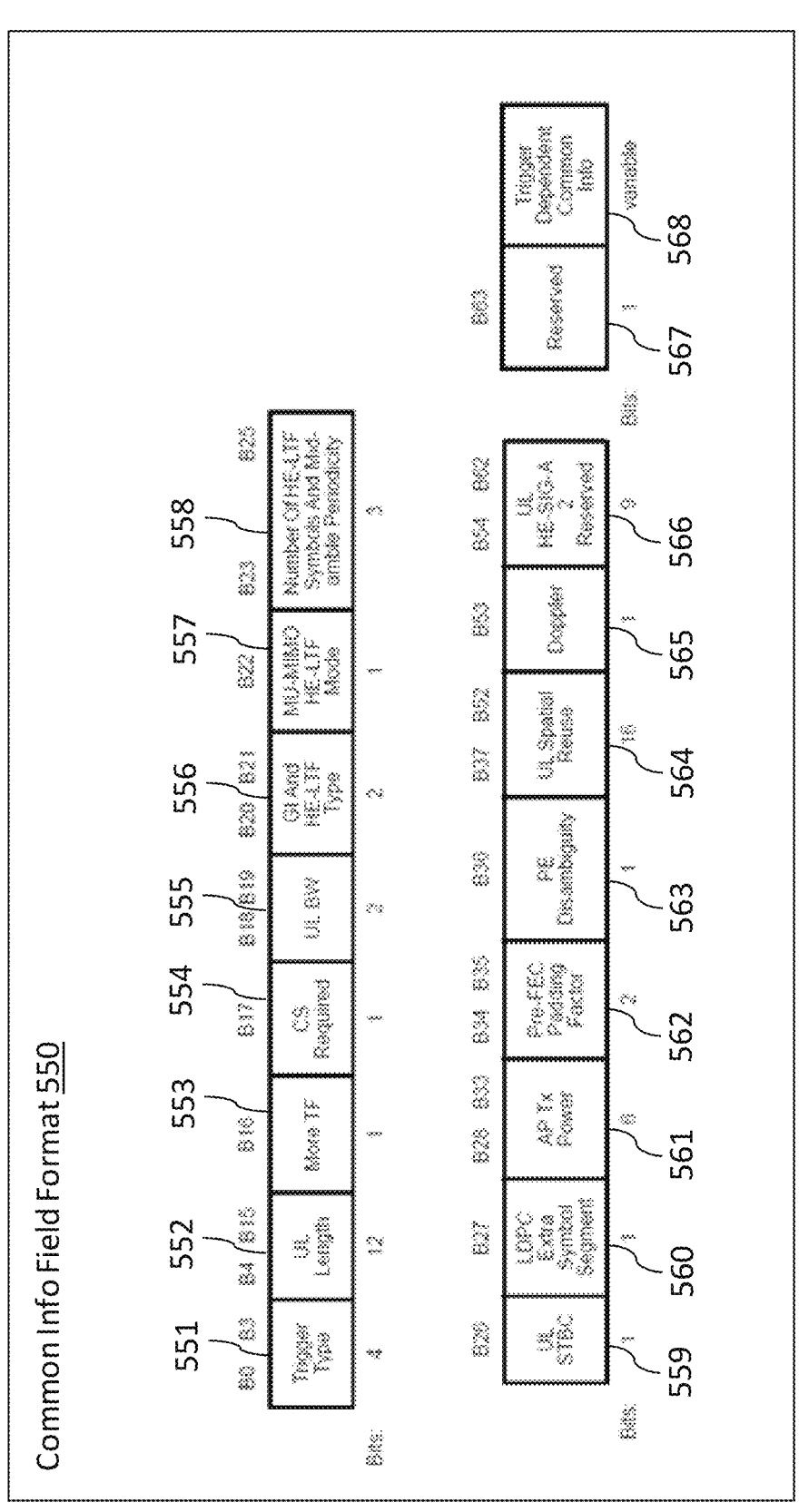

FIG. 5A, FIG. 5B and FIG. 5C illustrate examples for a BSR trigger frame format 500 (e.g., BSRP trigger frame), according to example implementations of the present disclosure. FIG. 5D illustrates an example trigger type subfield encoding 590, according to an example implementation of the present disclosure. Referring to FIG. 5A to FIG. 5D, the BSR trigger frame format 500 may include the fields of frame control 501, duration 502, receiver address 503, transmitter address 504, common information ("Common Info") 550, user information list 510 which includes a plurality of User Info fields (e.g., user information ("User Info") field format 520), padding 505, and/or frame check sequence (FCS) 506. The User Info field format 520 may include the subfields of association identifier (AID12) 521, RU (resource unit) allocation 522, UL FEC (forward error correction) coding type 523, UL HE-MCS (modulation coding scheme) 524, UL DCM (dual carrier modulation) 525, SS (spatial streams) allocation/RA-RU information 526, UL target receive power 527, reserved 528, and/or trigger dependent user information 529. The trigger dependent user information 529 may or may not be present in the trigger frame. The Common Info field 550 may include the subfields of trigger type 551, UL length 552, more TF (trigger frame) 553, CS (carrier sense) required 554, UL BW (bandwidth) 555, GI (guard interval) and LTF (long training field) type 556, MU (multi-user)-MIMO (multiple-input multiple-output) HE-LTF mode 557, number or HE-LTF symbols and mid-amble periodicity 558, UL STBC (space-time block coding) 559, LDPC (low-density parity check) extra symbol segment 560, AP Tx power 561, Pre-FEC padding factor 562, PE (packet extension) disambiguity 563, UL spatial reuse 564, Doppler 565, UL HE-S1G-A2 reserved 566, reserved 567, and/or trigger dependent common information 568. The trigger type subfield 551 may be set to a value (e.g., 4) indicating BSRP as defined in an item 592 in the trigger type subfield encoding 590. The trigger dependent common information 568 may or may not be present in the trigger frame.

Referring to FIG. 5A to 5D, an AP may send a BSRP trigger frame with the trigger frame format 500. The subfield of trigger type of the BSRP trigger (e.g., trigger type 551) may be set to 4 to indicate a BSRP trigger frame (see FIG. 5D). The BSRP trigger frame may indicate to one or more STAs to report their UL buffer statuses in responding frames (e.g., QoS-Data or QoS-Null frames). These BSR operations may be used in a target wake time (TWT) mechanism, e.g., restricted TWT (R-TWT), defined in a wireless local area network (WLAN) protocol (e.g., 802.11be). In a TWT mechanism, STAs (wireless devices such as a smart phone or a HWD) can adopt a wake time schedule that makes them wake up on a periodic basis to transmit/receive data. R-TWT can force all other 802.11be-compatible devices to finish their transmissions before a TWT service period (SP) begins. R-TWT may be used to provide prioritized access and medium access protection to a STA's peer-to-peer (p2p) traffic (e.g., p2p traffic 474 of the device 470 in FIG. 4B). This TWT mechanism (e.g., R-TWT) may require capability to report buffer status for a STA's p2p traffic to perform efficiently. For instance, an AP (e.g., AP 460 in FIG. 4B) may allocate resources (e.g., transmission opportunities (TXOP)) during an R-TWT SP for the STA's p2p traffic (e.g., the device 470's p2p traffic 474), according to the buffer status. During an on-going SP, if the AP can inquire status of a STA's peer-to-peer (p2p) traffic, it would help efficient operations (e.g., helping the AP to allocate resources efficiently). For example, a STA may indicate an empty buffer for p2p to the AP to indicate that the STA has completed delivering Latency Sensitive Traffic (LST). A TWT SP may be terminated to save power (if uplink/downlink (UL/DL) LST is also delivered), and AP can serve other STAs. The STA may indicate a non-empty buffer for p2p, to the AP close to an SP's end, to convey that the STA still has LST. The SP may be extended by the AP for the STA to deliver remaining buffered traffic. AP may also inquire buffer status itself to facilitate the above.

However, other/conventional buffer status request/poll (BSRP) trigger mechanism can solicit STA's uplink (UL) buffer status only. An AP cannot inquire status of STA's peer-to-peer (p2p) traffic using a BSRP trigger frame. There is hence a need/benefit to define new request methods for an AP to inquire/poll buffer status of p2p traffic.

To address this problem, a signaling method for requesting/polling buffer status report for p2p traffic may be provided/defined. In some embodiments, the format of a BSRP trigger frame may be redefined to indicate a request for buffer status for p2p traffic. For example, subfields/bits of the common information ("Common Info") field or the user information ("User Info") field may be redefined to indicate a request for buffer status for p2p traffic. A new trigger type for p2p traffic may defined using a trigger type field of the Common Info field.

In one approach, one or more bits (e.g., a reserved bit) in the User Info field of a BSRP trigger frame ("first p2p bit")

may be used to indicate a p2p buffer status request. When the first p2p bit is set in a trigger frame sent by an AP, the trigger frame may indicate/request/trigger a STA to include buffer status for its p2p traffic in response, using a BSR procedure. For example, when the first p2p bit is set to a first value (e.g., 1), the STA may or should send buffer status of its p2p traffic in response to the trigger frame. When the first p2p bit is set to a second value (e.g., 0), the STA may send buffer status of its uplink (UL) traffic in response to the trigger frame. Because the trigger frame uses the User Info field, this triggering method may or may not be used depending on the user or STA. For example, the User Info list field may include a plurality of User Info fields among which a first User Info field may indicate, to a first user/STA, p2p buffer status request, and a second User Info field may indicate, to a second user/STA, UL buffer status request. In some embodiments, one or more defined/re-purposed bits from any one or more fields (e.g., other than the User Info field or other than "reserved bit" of the User Info field) can be used to indicate to the STA to include its buffer status for its p2p traffic and/or other types of traffic (e.g., UL and/or DL).

In one approach, one or more bits (e.g., a reserved bit) in Common Info field of a BSRP trigger frame ("second p2p bit") may be used to indicate p2p buffer status request. When the second p2p bit is set in a trigger frame sent by an AP, the trigger frame may indicate/request/trigger a STA to include its buffer status for its p2p traffic in response, using a BSR procedure. For example, when the second p2p bit is set to a first value (e.g., 1), the STA may or should send buffer status of its p2p traffic in response to the trigger frame. When the second p2p bit is set to a second value (e.g., 0), the STA may send buffer status of its uplink traffic in response to the trigger frame. Because the trigger frame uses the Common Info field, this triggering method may be used by (or trigger) all users or all STAs receiving the trigger frame. In some embodiments, one or more defined/re-purposed bits from any one or more fields (e.g., other than the Common Info field) can be used to indicate to the STA to include its buffer status for its p2p traffic and/or other types of traffic (e.g., UL and/or DL).

In one approach, a new BSRP-p2p trigger frame may be defined to indicate p2p buffer status request. A new/specific trigger frame type for p2p traffic, e.g., "BSRP-p2p trigger frame type", may be added/introduced/defined as a value used in the trigger type field of the Common Info field. For example, a value such as 8 or any value that is not used by other types can be used. In some implementations, the frame format may be the same as or similar to that of a BSRP trigger frame. When a STA receives a BSRP-p2p trigger frame with the trigger type field set to the BSRP-p2p trigger frame type, the STA may or should include its buffer status for its p2p traffic in response, using a BSR procedure.

In one approach, an access point may include one or more processors. The one or more processors may be configured to generate a first frame to trigger a receiver device to send a response frame that includes buffer status data corresponding to wireless traffic between the receiver device and another device. The one or more processors may be configured to wirelessly transmit, via a transmitter, the generated first frame to one or more devices.

In one approach, the wireless traffic may include peer-to-peer (p2p) traffic between the receiver device and another device. In some embodiments, in generating the first frame, the one or more processors may be configured to set a frame type field of the first frame to a type indicating a buffer status trigger frame.

In one approach, the first frame may include a first User Info field that relates to a first device. In generating the first frame, the one or more processors may be configured to set a subfield of the first User Info field to a first value indicating a buffer status request for wireless traffic between the first device and a second device. The first frame may include a second User Info field relating to a third device. In generating the first frame, the one or more processors may be configured to set a subfield of the second User Info field to a second value indicating a buffer status request for wireless traffic between the access point and the third device, to trigger the third device to send a response frame that includes buffer status data corresponding to the wireless traffic between the access point and the third device.

In one approach, the first frame may include a Common Info field carrying information that is relevant to a plurality of users or receiver devices. In generating the first frame, the one or more processors may be configured to set a subfield of the Common Info field to a value indicating a buffer status request for wireless traffic between the receiver device and the another device.

In one approach, the first frame may include a Common Info field. In generating the first frame, the one or more processors may be configured to set a subfield of the Common Info field to a value to trigger a plurality of users or receiver devices to send respective response frames that include respective buffer status data corresponding to peer-to-peer (p2p) traffic.

In one approach, the first frame may include a frame type field. In generating the first frame, the one or more processors may be configured to set the frame type field to a type indicating a buffer status trigger frame for peer-to-peer (p2p) traffic.

In one approach, the first frame may include a Common Info field carrying information that is relevant to a plurality of users or receiver devices. The frame type field may be a subfield of the Common Info field.

In one approach, the first frame may include a frame type field. In generating the first frame, the one or more processors may be configured to set the frame type field to a type to trigger a plurality of users or receiver devices to send respective response frames that include respective buffer status data corresponding to wireless peer-to-peer (p2p) traffic.

Embodiments in the present disclosure have at least the following advantages and benefits. Embodiments in the present disclosure can provide useful techniques for inquiring the status of a STA's peer-to-peer (p2p) traffic using a BSRP trigger frame, thereby providing new request methods for an AP to inquire/poll a buffer status of p2p traffic. In some embodiments, a new request method can be provided by redefining the format of a BSRP trigger frame or by defining a new trigger frame type of BSR-p2p. In this manner, an AP can inquire/poll buffer status of p2p traffic of a particular user (e.g., using the User Info field) or all users (e.g., using the Common Info field).

Figure 6:
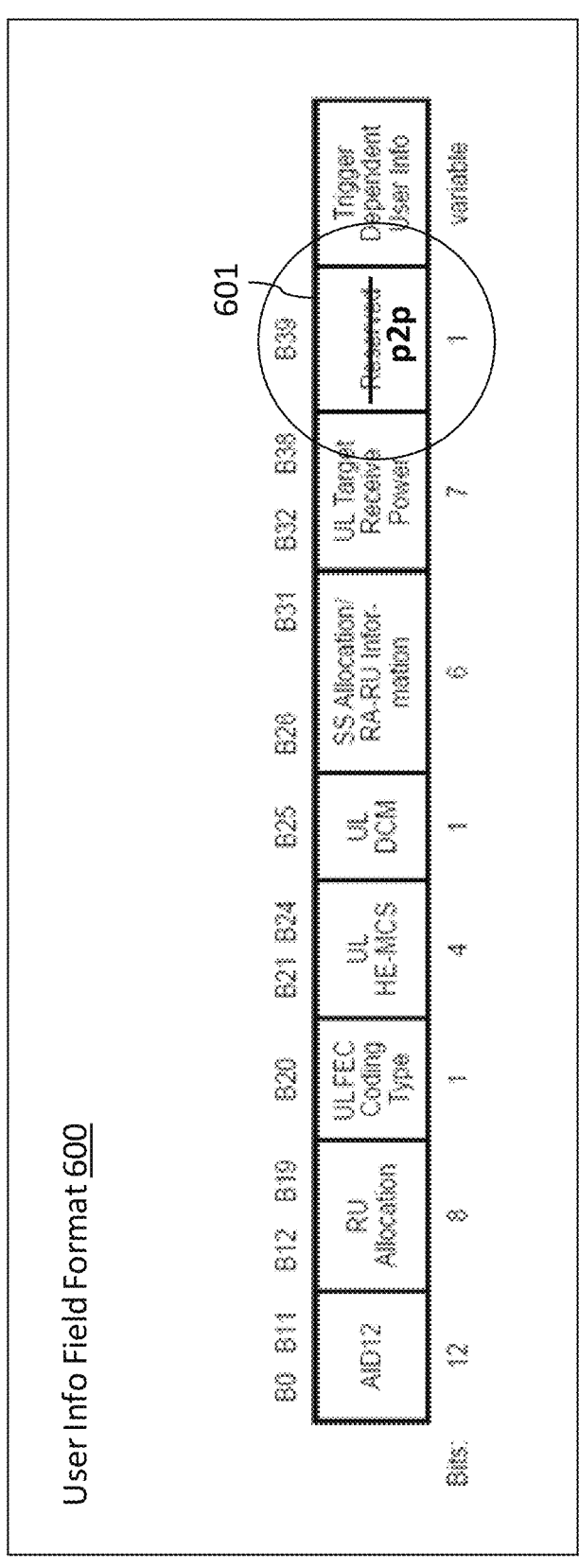
FIG. 6 illustrates an example User Info field format for indicating peer-to-peer (p2p) traffic, according to an example implementation of the present disclosure.

FIG. 6 illustrates an example user information ("User Info") field format 600 for indicating peer-to-peer (p2p) traffic, according to an example implementation of the present disclosure. The User Info field format 600 may be the same as or similar to the User Info field format 520, except a subfield 601. In some embodiments, the subfield 601 of the User Info field format 600 may redefine the reserved bit 528 (see FIG. 5B) to indicate/request/trigger a STA to include buffer status for its p2p traffic in response, using a BSR procedure. In some embodiments, the subfield 601 may be a single bit (e.g., bit B39 of the User Info field format 600). When the bit B39 is set in a trigger frame, the trigger frame sent by an AP (e.g., AP 460) may indicate/request/trigger a STA (e.g., device 470) to include buffer status for its p2p traffic (e.g., p2p traffic 474 between the device 470 and the device 480) in response, using a BSR procedure. For example, when the bit B39 is set to a first value (e.g., 1), the STA may or should send buffer status of its p2p traffic in response to the trigger frame. When the bit B39 is set to a second value (e.g., 0), the STA may send buffer status of its uplink (UL) traffic (e.g., UL traffic 472 from the device 470 to the AP 460) in response to the trigger frame. Because the trigger frame uses the User Info field, this triggering method may or may not be used depending on the user or STA (e.g., user or STA defined by the association ID in the AID12 subfield 521). For example, the User Info list field may include a plurality of User Info fields (each of which has the User Info field format 600) among which a first User Info field may indicate, to a first user/STA (e.g., device 470), p2p buffer status request, and a second User Info field may indicate, to a second user/STA (e.g., device 490), UL buffer status request. In some embodiments, one or more defined/re-purposed bits from any one or more fields (e.g., other than the User Info field 600 or other than "reserved bit" B39 of the User Info field)) can be used to indicate to the STA to include its buffer status for its p2p traffic and/or other types of traffic (e.g., UL and/or DL).

Figure 7:
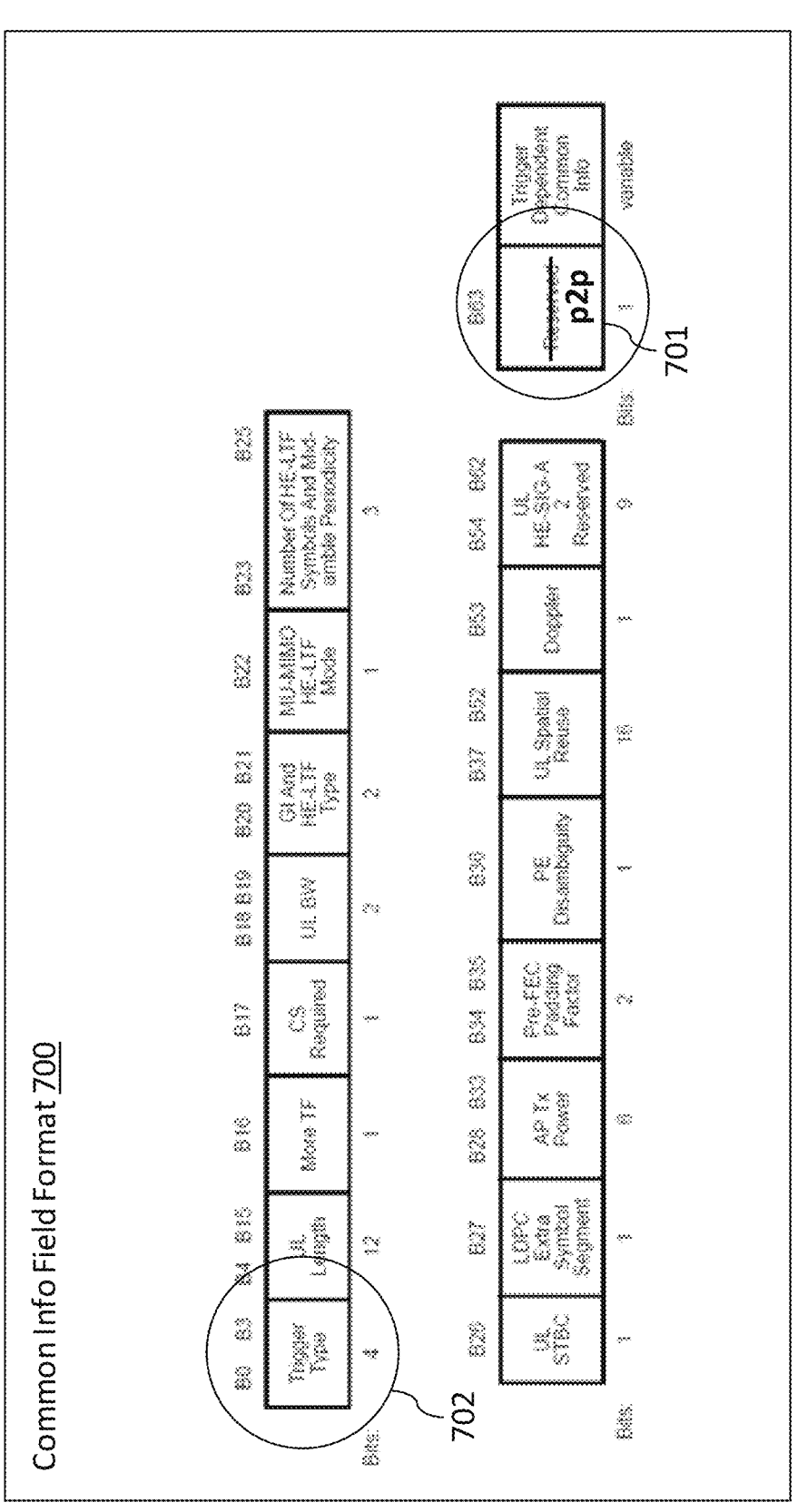
FIG. 7 illustrates an example Common Info field format for indicating p2p traffic, according to an example implementation of the present disclosure.

FIG. 7 illustrates an example common information ("Common Info") field format 700 for indicating p2p traffic, according to an example implementation of the present disclosure. The Common Info field format 700 may be the same as or similar to the Common Info field format 550, except a subfield 701. In some embodiments, the subfield 701 of the Common Info field format 700 may redefine the reserved bit 567 (see FIG. 5C) to indicate p2p buffer status request. In some embodiments, the subfield 701 may be a single bit (e.g., bit B63 of the Common Info field format 700). When the bit B63 is set in a trigger frame sent by an AP (e.g., AP 460), the trigger frame may indicate/request/trigger a STA (e.g., device 470) to include its buffer status for its p2p traffic (e.g., p2p traffic 474 between the device 470 and the device 480) in response, using a BSR procedure. For example, when the bit B63 is set to a first value (e.g., 1), the STA may or should send buffer status of its p2p traffic in response to the trigger frame. When the bit B63 is set to a second value (e.g., 0), the STA may send buffer status of its uplink traffic in response to the trigger frame. Because the trigger frame uses the Common Info field, this triggering method may be used by (or trigger) all users or all STAs receiving the trigger frame (e.g., all STAs associating with the AP 460 including device 470 and device 490). In some embodiments, one or more defined/re-purposed bits from any one or more fields (e.g., other than the Common Info field) can be used to indicate to the STA to include its buffer status for its p2p traffic and/or other types of traffic (e.g., UL and/or DL).

FIG. 8 illustrates an example trigger type subfield encoding 800 for indicating a BSR trigger frame for p2p traffic, according to an example implementation of the present disclosure. In one approach, a new BSRP-p2p trigger frame may be defined to indicate p2p buffer status request. A new trigger frame type 802 for p2p traffic, e.g., "BSRP-p2p trigger frame type", may be added/introduced/defined as a value used in the trigger type field of the Common Info field (e.g., trigger type field 702 of the Common Info field 700 in FIG. 7). For example, a value such as 8 or any value (e.g., $8 \leq N \leq 15$ when the trigger type subfield encoding 800 is used) that is not used by other types can be used. In some implementations, the frame format may be the same as or similar to that of a BSRP trigger frame (e.g., trigger frame format as shown in FIGS. 5A, 5B and 5C). When a STA (e.g., device 470) receives, from an AP (e.g., AP 460) a BSRP-p2p trigger frame with the trigger type field set to the BSRP-p2p trigger frame type, the STA may or should include its buffer status for its p2p traffic in response, using a BSR procedure.

Figure 9:
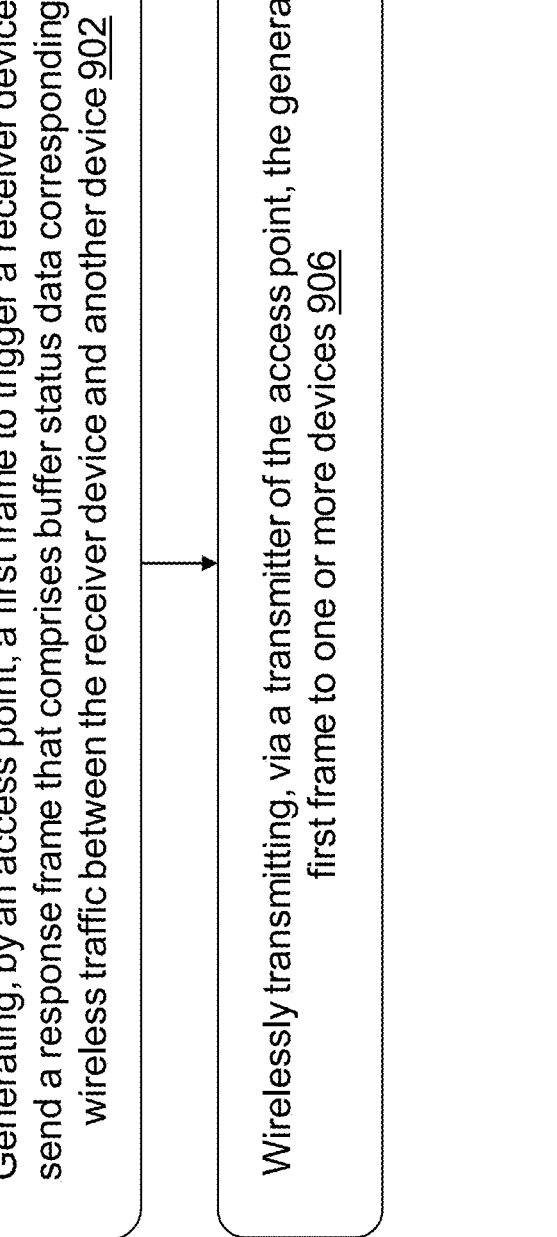
FIG. 9 is a flowchart showing a process of sending a request for buffer status data of p2p traffic, according to an example implementation of the present disclosure.

FIG. 9 is a flowchart showing a process 900 of sending a request for buffer status data of p2p traffic, according to an example implementation of the present disclosure. In some embodiments, the process 900 is performed by an access point (e.g., AP 460 or soft-enabled AP (soft-AP)). In some embodiments, the process 900 is performed by other entities. In some embodiments, the process 900 includes more, fewer, or different steps than shown in FIG. 10.

In one approach, the access point (e.g., AP 460) may generate 902 a first frame (e.g., a BSRP trigger frame including the User Info field format 600, a BSRP trigger frame including the Common Info format 700, or a trigger frame having a new BSRP-p2p type 802) to trigger a receiver device (e.g., device 470) to send a response frame (e.g., BSR response frame) that includes buffer status data corresponding to wireless traffic (e.g., p2p traffic 474) between the receiver device (e.g., device 470) and another device (e.g., device 480). In some embodiments, the wireless traffic may include peer-to-peer (p2p) traffic between the receiver device and the another device. In some embodiments, in generating the first frame, the access point may set a frame type field (e.g., trigger type subfield 702) of the first frame to a type indicating a buffer status trigger frame (e.g., BSRP type 592) because the first frame reuses/redefines the format of the existing BSR trigger-type frame.

In some embodiments, the first frame (e.g., a BSRP trigger frame including the User Info field format 600) may include a first User Info field that relates to a first device (e.g., User Info field format 600 with the AID12 subfield set to an association with the first device 470). In generating the first frame, the access point may set a subfield (e.g., subfield 601) of the first User Info field to a first value (e.g., 1) indicating a buffer status request for wireless traffic between the first device (e.g., device 470) and a second device (e.g., device 480). The first frame may include a second User Info field relating to a third device (e.g., User Info field format 600 with the AID12 subfield set to an association with the third device 490). In generating the first frame, the access point may set a subfield of the second User Info field (e.g., subfield 601) to a second value (e.g., 0) indicating a buffer status request for wireless traffic (e.g., UL/DL traffic 492) between the access point (e.g., AP 460) and the third device (e.g., device 490), to trigger the third device to send a response frame that includes buffer status data corresponding to the wireless traffic between the access point and the third device (e.g., UL traffic 492 from the third device 490).

In some embodiments, the first frame (e.g., a BSRP trigger frame including the Common Info format 700) may include a Common Info field carrying information that is relevant to a plurality of users or receiver devices. In generating the first frame, the access point (e.g., AP 460) may set a subfield (e.g., subfield 701) of the Common Info field (e.g., Common Info format 700) to a value (e.g., 1) indicating a buffer status request for wireless traffic between the receiver device (e.g., device 470) and the another device (e.g., device 480).

In some embodiments, the first frame (e.g., a BSRP trigger frame including the Common Info format 700) may include a Common Info field. In generating the first frame, the access point (e.g., AP 460) may set a subfield (e.g., subfield 701) of the Common Info field (e.g., Common Info format 700) to a value (e.g., 1) to trigger a plurality of users or receiver devices (e.g., device 470 and device 490) to send respective response frames that include respective buffer status data corresponding to peer-to-peer (p2p) traffic.

In some embodiments, the first frame (e.g., a trigger frame having a new BSRP-p2p type 802) may include a frame type field (e.g., trigger type subfield 702). In generating the first frame, the access point may set the frame type field to a type (e.g., new BSRP-p2p type 802) indicating a buffer status trigger frame for peer-to-peer (p2p) traffic. The first frame may include a Common Info field carrying information that is relevant to a plurality of users or receiver devices (e.g., device 470 and device 490). The frame type field may be a subfield of the Common Info field (e.g., trigger type subfield 702 of Common Info field format 700).

In some embodiments, the first frame (e.g., a trigger frame having a new BSRP-p2p type 802) may include a frame type field (e.g., trigger type subfield 702 of Common Info field format 700). In generating the first frame, the access point may set the frame type field to a type (e.g., new BSRP-p2p type 802) to trigger a plurality of users or receiver devices (e.g., device 470 and device 490) to send respective response frames that include respective buffer status data corresponding to wireless peer-to-peer (p2p) traffic.

In one approach, the access point (e.g., AP 460) may wirelessly transmit 904, via a transmitter of the access point, the generated first frame to one or more devices (e.g., device 470 and device 490).

2. Providing Buffer Status Report for Wireless Peer-to-Peer (p2p) Traffic

Figure 10B:
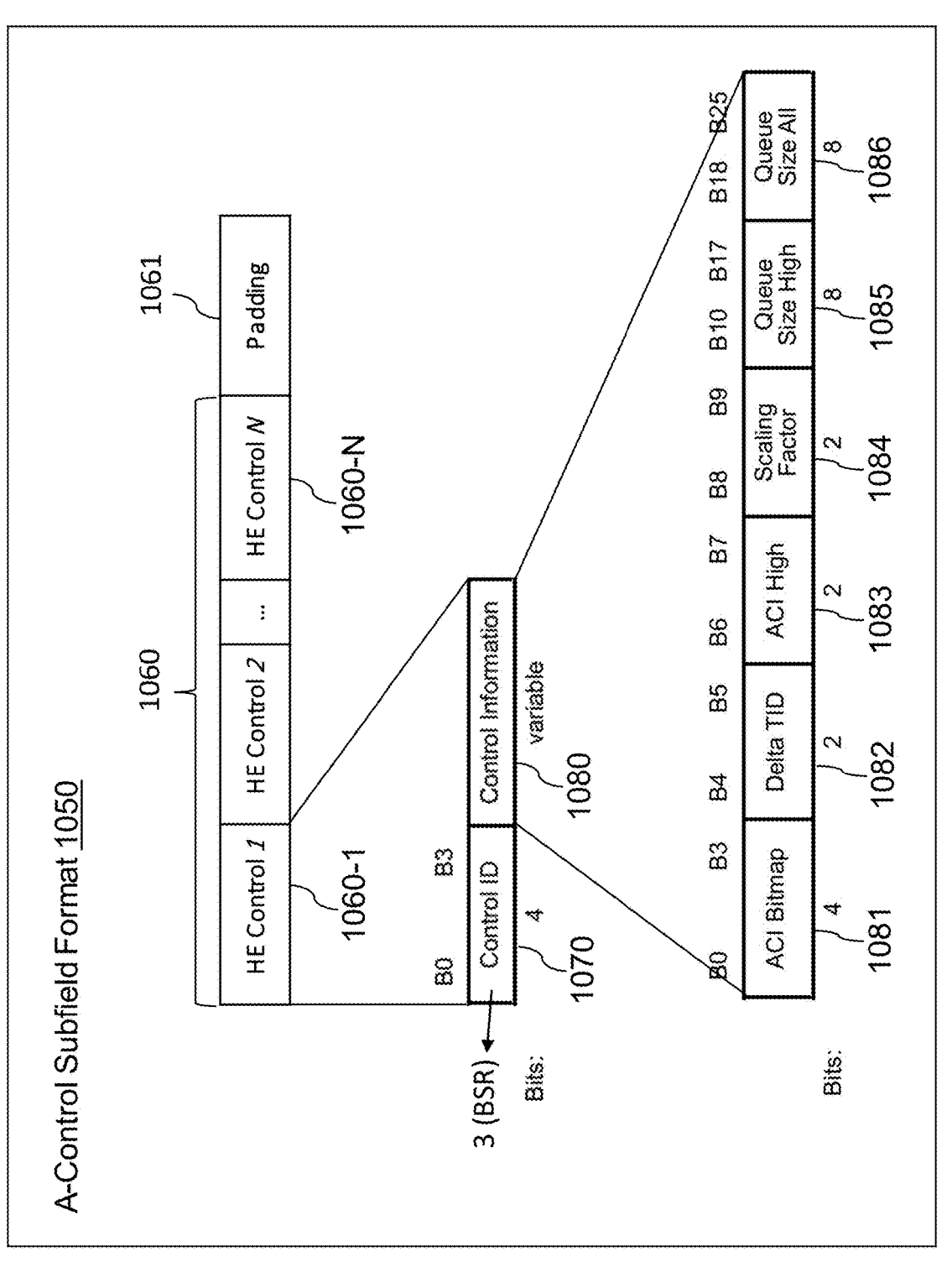
FIG. 10B illustrates an example format of an aggregate control (A-control) subfield of a control field for BSR control, according to an example implementation of the present disclosure.

FIG. 10A and FIG. 10B show two buffer status report procedures—(1) using a quality of service (QoS) control field format (FIG. 10A) and (2) using an aggregate control (A-control) subfield format (FIG. 10B).

FIG. 10A illustrates an example QoS control field format 1000, according to an example implementation of the present disclosure. The QoS control field format 1000 may include subfield 1001 (bits 0-3), subfield 1002 (bit 4), subfield 1003 (bits 5-6), subfield 1004 (bit 7), and/or subfield 1005 (bits 8-15). A STA (e.g., device 470) may report its buffer status by specifying a queue size in a QoS control field of a frame (e.g., QoS Data frame or QoS Null frame) and sending the frame to an AP (e.g., AP 460). For example, in response to a buffer status report request (e.g., BSRP trigger frame) from an AP (e.g., AP 460), a receiver STA (e.g., device 470) may send a QoS data frame or a QoS Data CF (contention free)-ACK frame 1010 to the AP to report buffer status data relating to UL traffic for a particular TID (traffic identifier). In the QoS control field of the frame 1010, the STA may set (1) the subfield 1001 to a TID; (2) the subfield 1002 to 1; (3) the subfield 1003 to an Ack policy indicator; (4) the subfield 1004 to a value indicating that A-MSDU (aggregated MAC service data unit) is present; and/or (5) the subfield 1005 to a queue size of UL traffic for the TID set in the subfield 1001. In response to a buffer status report request from the AP, a receiver STA may send a QoS Null frame 1020 to the AP to report buffer status data relating to UL traffic for a particular TID. In the QoS control field of the frame 1020, the STA may set (1) the subfield 1001 to a TID; (2) the subfield 1002 to 1; (3) the subfield 1003 to an Ack policy indicator; and/or (4) the subfield 1005 to a queue size of UL traffic for the TID set in the subfield 1001. For a QoS Null frame, the subfield 1004 may not be used (or may be "reserved") in reporting buffer status data.

FIG. 10B illustrates an example format of an aggregate control (A-control) subfield 1050 of a control field for BSR control, according to an example implementation of the present disclosure. The A-control subfield format 1050 of a High Efficiency (HE) variant High Throughput (HT) control field may include the fields of a plurality of HE controls 1060 (including HE control-1 1060-1, HE control-2 1060-2, . . . , 1060-N) and a padding 1061. Each HE control may include the fields of control ID 1070 and control information 1080. For BSR response, the control ID field 1070 may be set to a value (e.g., 3) indicating BSR (see Table 1). The control information field (or BSR control field) 1080 may include the subfields of ACI (Access Category Identifier) bitmap 1081, delta TID 1082, ACI high 1083, scaling factor 1084, queue size high 1085, and/or queue size all 1086. For example, in response to a buffer status report request (e.g., BSRP trigger frame) from an AP (e.g., AP 460), a receiver STA (e.g., device 470) may report its buffer status by specifying a queue size in the 'queue size all' subfield 1086 of a frame and sending the frame to the AP. Queue sizes may be reported for ACI indicated in the ACI bitmap subfield 1081, which indicates the access category (or access categories) for which data stored in the STA's buffer is intended. Each bit of the ACI bitmap subfield 1081 can indicate the presence of a service intended for a corresponding AC. A value set in the delta TID subfield 1082 may indicate the number of TIDs corresponding to the number of bits in the ACI bitmap subfield 1081 that are set to 1. For example, if (1) the number of bits in the ACI bitmap subfield that are set to 1 equals 1, and (2) the delta TID is set to value 1, the delta TID may indicate 2 TIDs. If the number of bits in the ACI bitmap subfield that are set to 1 equals 0, values 0 to 2 in the delta TID may not be applicable, e.g., may not indicate the number of TIDs. A value set in the queue size all subfield 1086 may indicate/report a combined queue size of all ACs indicated in the ACI bitmap subfield 1081. A value set in the queue size high subfield 1085 may indicate/report a queue size of ACI indicated in the ACI high subfield 1083.

TABLE 1

| | Control ID subfield values | |
|---|---|---|
| Control ID value | Meaning | Length of the control information subfield (bits) |
| 0 | Triggered response scheduling (TRS) | 26 |
| 1 | Operating mode (OM) | 12 |
| 2 | HE link adaptation (HLA) | 26 |
| 3 | Buffer status report (BSR) | 26 |
| 4 | UL power headroom (UPH) | 8 |
| 5 | Bandwidth query report (BQR) | 10 |
| 6 | Command and status (CAS) | 8 |
| 7-14 | Reserved | |
| 15 | Ones need expansion surely (ONES) | 26 |

A WLAN protocol (e.g., 802.11be) can define a TWT mechanism, e.g., restricted TWT (R-TWT), In a TWT mechanism, STAs can adopt a wake time schedule that makes them wake up on a periodic basis to transmit/receive data. R-TWT can force all other 802.11be-compatible devices to finish/terminate their transmissions before a TWT SP begins. R-TWT may be used to provide prioritized access and medium access protection to a STA's p2p traffic. This TWT mechanism (e.g., R-TWT) may require capability to report buffer status for a STA's p2p traffic to perform efficiently. For instance, an AP may allocate resources during an R-TWT SP for the STA's p2p traffic, according to the buffer status. During an on-going SP, if the AP can inquire status of a STA's p2p traffic, it would help efficient operations (e.g., helping the AP to allocate resources efficiently). For example, a STA may indicate an empty buffer for p2p to the AP to indicate that the STA has completed delivering Latency Sensitive Traffic (LST). A TWT SP may be terminated to save power, and the AP can serve other STAs. The STA may indicate non-empty buffer for p2p to the AP close to an SP's end to convey that the STA still has LST. The SP may be extended to deliver remaining buffered traffic. AP may also inquire buffer status itself to facilitate the above.

The conventional buffer status report mechanism can report buffer status for a STA's uplink traffic only. A STA cannot report buffer status of its p2p traffic. For example, a QoS control field in QoS data frames and/or QoS null frames (see FIG. 10A) cannot indicate or report buffer status of p2p traffic. A BSR control field in an A-control subfield of a HE variant HT control field (see FIG. 10B) cannot indicate or report buffer status of p2p traffic. There is a need/benefit to define new request methods for a STA to report buffer status of p2p traffic to an AP.

To address this problem, a QoS control field (e.g., QoS control field 1000) or a BSR control field (e.g., control information subfield 1080) may be redefined/repurposed to indicate (a report of) buffer status for p2p traffic. In some implementations, a BSR Control field (or other field) may be modified or redefined to indicate (a report of) p2p traffic. The BSR Control subfield may have an invalid combination of values according to some subfield encoding. For example, setting the ACI bitmap subfield (or other subfield/bit) to 0 and the delta TID subfield (or other subfield/bit) to 0 may be an invalid combination according to a Delta TID encoding. The encoding may be modified or redefined such that when (1) the ACI bitmap subfield (or other subfield/bit) is set to 0 and (2) the delta TID subfield (or other subfield/bit) is set to 0 or any non-applicable numbers (e.g., value 0 to 2), the combination of the values in the ACI bitmap subfield and the delta TID subfield may indicate that buffer status reported in the 'queue size all' subfield is for a STA's p2p traffic. In this case, the ACI high subfield (or other subfield/bit) and the queue size high subfield (or other subfield/bit) may be reserved. In some embodiments, the 'queue size all' subfield and the queue size high subfield (or other subfields/bits) may be combined into a single queue size subfield (e.g., 16-bit queue size subfield). In this case, the ACI high subfield (or other alternative subfield/bit) may be reserved.

In some implementations, a QoS control field (or other field/bits) in QoS data frames and QoS null frames may be modified or redefined to indicate (a report of) p2p traffic. According to some definition of the QoS control field, when a STA sends a QoS null frame including a QoS control field with bit 4 thereof set to 1, bit 7 of the QoS control field may be reserved and bits 8-15 of the QoS control field may indicate a queue size. In some implementations, the bits of the QoS control field (or other field/bits) may be modified or redefined. For example, when bit 4 is set to 1 and bit 7 is set to 0, the queue size may be for a STA's UL (uplink) traffic, belonging to TID indicated in bits 0-3. When bit 4 is set to 1 and bit 7 is set to 1, the queue size may be for the STA's p2p traffic and TID subfield (bits 0-3) and bits 5-7 may be reserved, as a non-limiting example.

In some implementations, a new (type of) BSR-p2p control field, e.g., a BSR-p2p Control field (or other field/bits), may be added and defined for A-Control subfield (or other subfield) of the HE variant HT Control field (or other field). A new control ID may be defined/used to indicate a BSR-p2p frame. For example, a control ID value 7 or any other available value (e.g., 8 to 14 which are reserved in Table 1) may be newly defined and used. See Table 2 which includes the new control ID value. The format of the new control field may include a scaling factor subfield (e.g., 2 bits) and a queue size subfield (e.g., 8 bits). The scaling factor (SF) subfield (or other subfield/bit) may define SF octets, and the queue size subfield (or other subfield/bit) may indicate the amount of buffered p2p traffic in units of SF octets (according to the definition of SF octets as shown in Table 3, for example), that is intended for the STA's peer STA on the p2p link(s).

TABLE 2

Control ID subfield values (new control ID value added)

| Control ID value | Meaning | Length of the control information subfield (bits) |
|---|---|---|
| 0 | Triggered response scheduling (TRS) | 26 |
| 1 | Operating mode (OM) | 12 |
| 2 | HE link adaptation (HLA) | 26 |
| 3 | Buffer status report (BSR) | 26 |
| 4 | UL power headroom (UPH) | 8 |
| 5 | Bandwidth query report (BQR) | 10 |
| 6 | Command and status (CAS) | 8 |
| 7 | Buffer status report for p2p traffic (BSR-p2p) | 16 |
| 8-14 | Reserved | |
| 15 | Ones need expansion surely (ONES) | 26 |

TABLE 3

Scaling Factor subfield encoding

| Value in Scaling Factor subfield | Scaling factor, SF (octets) |
|---|---|
| 0 | 16 |
| 1 | 256 |
| 2 | 2048 |
| 3 | 32768 |

In one approach, a first device may include one or more processors. The one or more processors may be configured to generate a first frame including buffer status data corresponding to wireless traffic between the first device and a second device. Each of the first device and the second device may not be an access point. The one or more processors may be configured to wirelessly transmit, via a transceiver, the generated first frame to an access point in a wireless local area network (WLAN).

In one approach, the one or more processors may be further configured to wirelessly receive, via the transceiver from the access point, a second frame. In response to the second frame, the one or more processors may be configured to generate the first frame.

In one approach, the wireless traffic may include peer-to-peer (p2p) traffic between the first device and the second device. In some embodiments, the first frame may include a control identifier field. In generating the first frame, the one or more processors may be configured to set the control identifier field to a value indicating a buffer status report frame.

In one approach, the first frame may include a bitmap field that includes a plurality of bits corresponding to a plurality of access categories. In generating the first frame, the one or more processors may be configured to set each of the plurality of bits to a first value indicating that there is no traffic associated with an access category corresponding to the bit.

In one approach, the first frame may include a number of traffic identifiers field indicating a number of traffic identifiers for which there is buffered traffic. In generating the first frame, the one or more processors may be configured to set the number of traffic identifiers field to a second value indicating that the number of traffic identifiers for which there is buffered traffic is zero.

In one approach, the first frame may include a quality of service (QoS) control field that includes a first field. In generating the first frame, the one or more processors may be configured to set the first field to a value indicating presence of wireless peer-to-peer (p2p) traffic. The QoS control field includes a second field. In generating the first frame, the one or more processors may be configured to set the second field to a value indicating a queue size of the wireless traffic between the first device and the second device.

In one approach, the first frame may include a control identifier field. In generating the first frame, the one or more processors may be configured to set the control identifier field to a value indicating a peer-to-peer (p2p) buffer status report frame. The first frame may include a queue size field. In generating the first frame, the one or more processors may be configured to set the queue size field to a value indicating a queue size of the wireless traffic between the first device and a second device.

Embodiments in the present disclosure have at least the following advantages and benefits. Embodiments in the present disclosure can provide useful techniques for a STA to report buffer status of its p2p traffic. In some embodiments, a QoS control field (e.g., QoS control field 1000 in FIG. 10A) or a BSR control field (e.g., control information subfield 1080 in FIG. 10B) may be redefined/repurposed to indicate (report of) buffer status for p2p traffic, thereby defining new request methods for a STA to report buffer status of p2p traffic to an AP.

Figure 11:
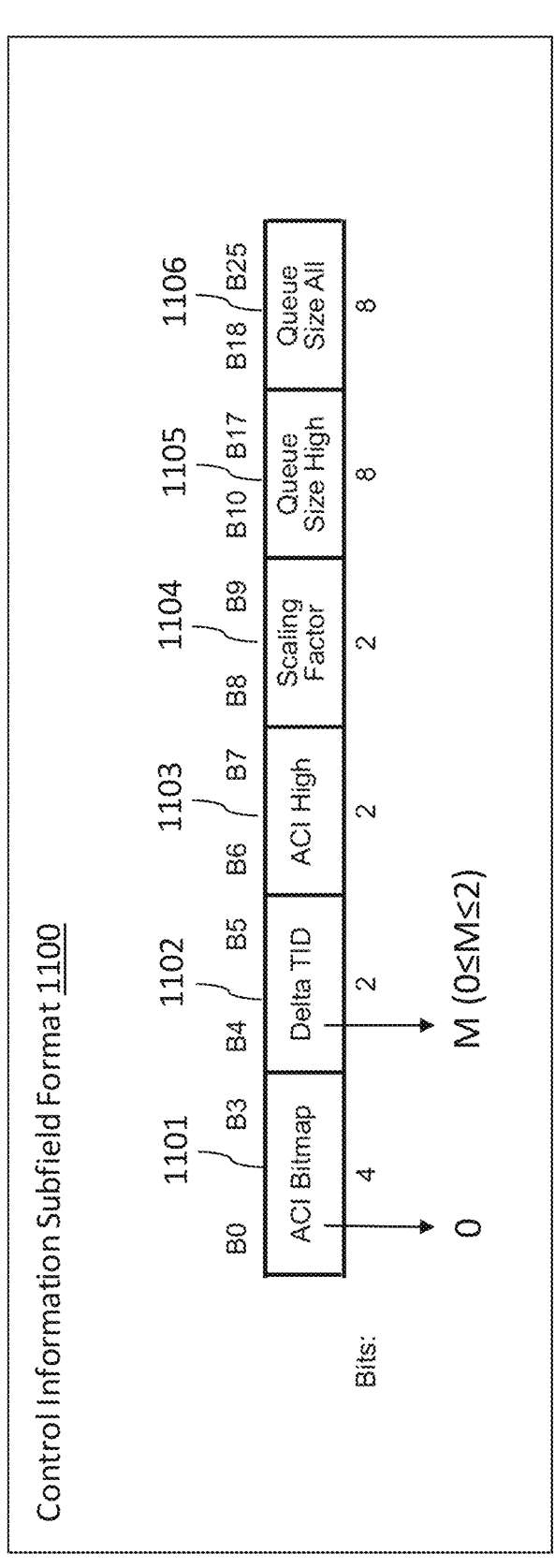
FIG. 11 illustrates an example format of a control information subfield of an A-control subfield for reporting buffer status for p2p traffic, according to an example implementation of the present disclosure.

FIG. 11 illustrates an example format of a control information subfield (or BSR control subfield) 1100 of an A-control subfield for reporting buffer status for p2p traffic, according to an example implementation of the present disclosure. The control information field (or BSR control field) 1100 may include the subfields of ACI bitmap 1101, delta TID 1102, ACI high 1103, scaling factor 1104, queue size high 1105, and/or queue size all 1106. In some implementations, the BSR Control subfield (or other field) 1100 may be modified or redefined to indicate (report of) p2p traffic. The BSR Control subfield may have an invalid combination of values according to some subfield encoding. For example, setting the ACI bitmap subfield (or other subfield/bit) to 0 and the delta TID subfield (or other subfield/bit) to 0-2 may be an invalid combination according to a Delta TID encoding. The encoding may be modified or redefined such that when (1) the ACI bitmap subfield 1101 (or other subfield/bit) is set to 0 and (2) the delta TID subfield 1102 (or other subfield/bit) is set to 0 or any previously non-applicable number M (e.g., 0≤M≤2), the combination of the values in the ACI bitmap subfield and the delta TID subfield may indicate that buffer status reported in the queue size all subfield 1106 is for a STA's p2p traffic. In this case, the ACI high subfield 1103 (or other subfield/bit) and the queue size high subfield 1105 (or other subfield/bit) may be reserved. For example, in response to a buffer status report request (e.g., BSRP trigger frame) from an AP (e.g., AP 460), a receiver STA (e.g., device 470) may report its buffer status for p2p traffic to/from a peer device (e.g., device 480) by (1) setting both the ACI bitmap subfield 1101 and the delta TID subfield 1102 of a frame to 0, (2) specifying a queue size for the p2p traffic in the queue size all subfield 1106 of the frame, and (3) sending the frame to the AP. In some embodiments, the queue size all subfield 1106 and the queue size high subfield 1105 (or other subfields/bits) may be combined into a single queue size subfield (e.g., 16-bit queue size subfield). In this case, the ACI high subfield 1103 (or other alternative subfield/bit) may be reserved.

FIG. 12 illustrates an example QoS control field format 1200 for reporting buffer status for p2p traffic, according to an example implementation of the present disclosure. The QoS control field format 1200 may include subfield 1201 (bits 0-3), subfield 1202 (bit 4), subfield 1203 (bits 5-6), subfield 1204 (bit 7), and/or subfield 1205 (bits 8-15). In some implementations, a QoS control field (or other field/bits) in QoS data frames and QoS null frames may be modified or redefined to indicate (report of) p2p traffic. According to some definition of the QoS control field (e.g., QoS control field 1000 in FIG. 10A), when a STA sends a QoS null frame (e.g., QoS Null frame 1020) including a QoS control field with bit 4 (e.g., subfield 1002) thereof set to 1, bit 7 of the QoS control field (e.g., subfield 1004) may be reserved and bits 8-15 of the QoS control field (e.g., subfield 1005) may indicate a queue size. In some implementations, the bits of the QoS control field (or other field/bits) may be modified or redefined. Referring to FIG. 12, when the subfield 1202 (bit 4) of a QoS Null frame 1220 is set to 1 and the subfield 1204 (bit 7) of the QoS Null frame 1220 is set to 0, the queue size set in the subfield 1205 may be for a STA's UL traffic, belonging to TID indicated in the subfield 1201 (bits 0-3). When the subfield 1202 (bit 4) is set to 1 and the subfield 1204 (bit 7) is set to 1, the queue size may be for the STA's p2p traffic and the TID subfield 1201 (bits 0-3) and the subfield 1203 (bits 5-6) may be reserved, as a non-limiting example. For example, in response to a buffer status report request (e.g., BSRP trigger frame) from an AP (e.g., AP 460), a receiver STA (e.g., device 470) may report its buffer status for p2p traffic to/from a peer device (e.g., device 480) by (1) setting both the subfield 1202 (bit 4) and the subfield 1204 (bit 7) of a QoS Null frame to 1, (2) specifying a queue size for the p2p traffic in the subfield 1205 (bits 8-15) of the QoS Null frame, and (3) sending the QoS Null frame to the AP.

Figure 13:
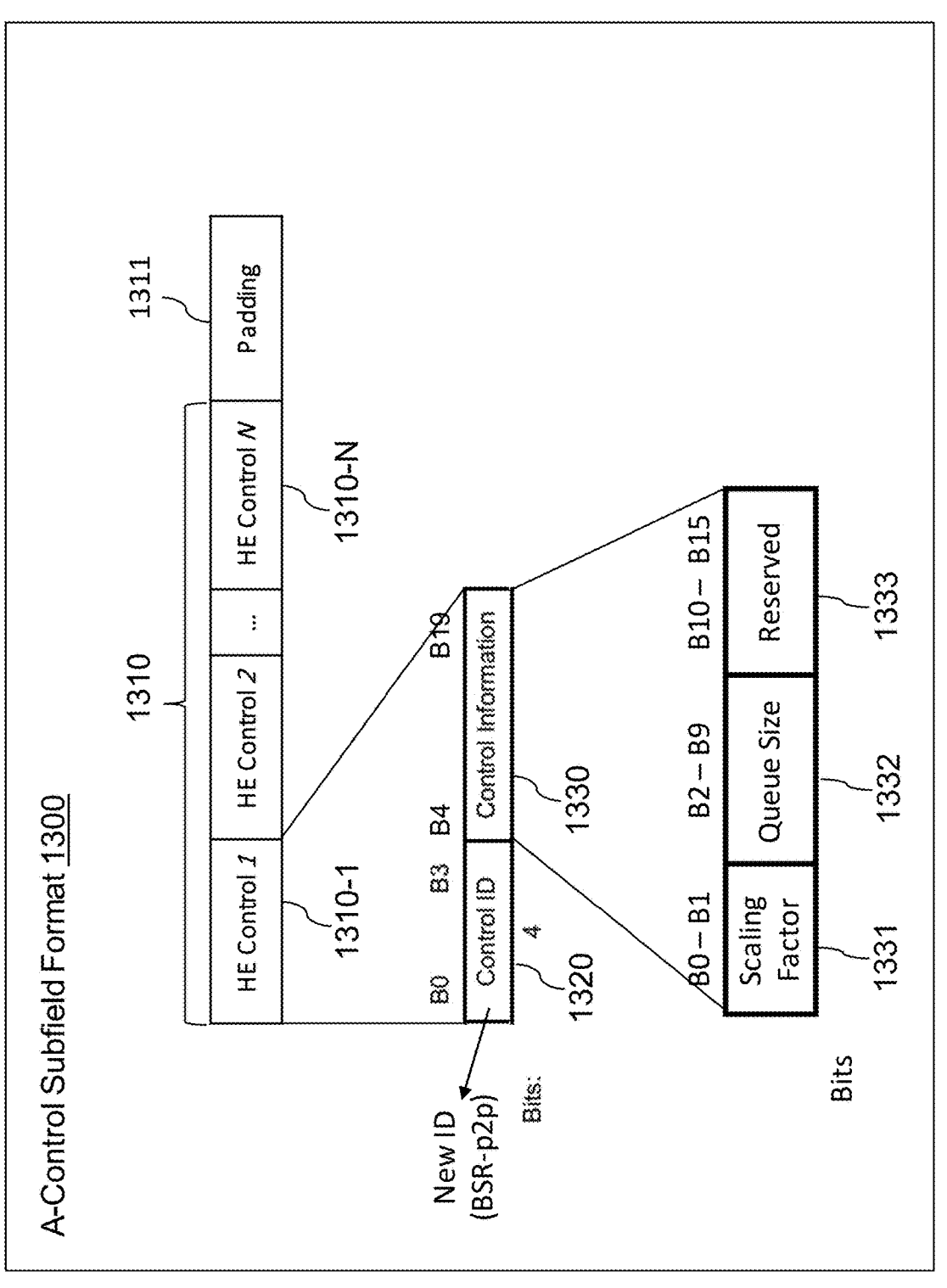
FIG. 13 illustrates an example format of an A-control subfield of a control field for reporting buffer status for p2p traffic, according to an example implementation of the present disclosure.

FIG. 13 illustrates an example format of an A-control subfield 1300 of a control field for reporting buffer status for p2p traffic, according to an example implementation of the present disclosure. The A-control subfield format 1300 of a HE variant HT control field may include the fields of a plurality of HE controls 1310 (including HE control-1 1310-1, HE control-2 1310-2, . . . , 1310-N) and a padding 1311. Each HE control may include the fields of control ID 1320 and control information 1330. In some implementations, a new (type of) BSR-p2p control field, e.g., a BSR-p2p Control field (or other field/bits), may be added and defined for A-Control subfield (or other subfield) of the HE variant HT Control field (or other field). A new control ID may be defined/used to indicate a BSR-p2p frame. For example, a control ID value 7 or any other available value (e.g., 8 to 14 which are reserved in Table 1) may be newly/specifically defined and used. See Table 2 which includes the new/specific control ID value. For BSR-p2p response, the control ID field 1320 may be set to a new/specific value (e.g., 7) indicating BSR-p2p (see Table 2). The control information field (or BSR control field) 1330 may include the subfields of scaling factor 1331, queue size 1332, and/or reserved 1333. In some implementations, the scaling factor subfield 1331 may be 2 bits and the queue size subfield 1332 may be 8 bits. The scaling factor (SF) subfield 1331 may define SF octets, and the queue size subfield 1332 may indicate the amount of buffered p2p traffic in units of SF octets (according to the definition of SF octets as shown in Table 3, for example), that is intended for the STA's peer STA on the p2p link(s). For example, in response to a buffer status report request (e.g., BSRP trigger frame) from an AP (e.g., AP 460), a receiver STA (e.g., device 470) may report its buffer status for p2p traffic to/from a peer device (e.g., device 480) by (1) setting the control ID subfield 1320 of a frame to the new value indicating BSR-p2p, (2) specifying a queue size for the p2p traffic in the queue size subfield 1332 of the frame, and (3) sending the frame to the AP.

FIG. 14 is a flowchart showing a process 1400 of reporting buffer status for p2p traffic, according to an example implementation of the present disclosure. In some embodiments, the process 1400 is performed by a first device (e.g., STA device 470 or 490). In some embodiments, the process 1400 is performed by other entities. In some embodiments, the process 1400 includes more, fewer, or different steps than shown in FIG. 14.

In one approach, the first device (e.g., device 470) may generate 1402 a first frame (e.g., a frame including a control information subfield 1100, a QoS Null frame including a QoS control field 1200, a frame including an A-Control subfield 1300 for reporting buffer status for p2p traffic) including buffer status data corresponding to wireless traffic (e.g., p2p traffic 474) between the first device (e.g., device 470) and a second device (e.g., device 480). Each of the first device and the second device may not be an access point.

In some embodiments, the first device may wirelessly receive, via the transceiver from an access point (e.g., AP 460), a second frame (e.g., BSRP trigger frames as shown in FIG. 5A to FIG. 8). In response to the second frame, the first device may generate the first frame. In some embodiments, the wireless traffic may include peer-to-peer (p2p) traffic between the first device and the second device (e.g., p2p traffic 474). In some embodiments, the first frame may include a control identifier field (e.g., control ID subfield 1070). In generating the first frame, the first device may set the control identifier field to a value indicating a buffer status report frame (e.g., a value 3 indicating BSR as shown in Table 1 and Table 2), because this method reuse/redefine the existing A-Control subfield format for reporting buffer status for UL/DL traffic.

In some embodiments, the first frame (e.g., a frame including a control information subfield 1100) may include a bitmap field (e.g., ACI bitmap 1101) that includes a plurality of bits corresponding to a plurality of access categories. In generating the first frame, the first device may set each of the plurality of bits to a first value (e.g., 0) indicating that there is no traffic associated with an access category corresponding to the bit. The first frame may include a number of traffic identifiers field (e.g., delta TID 1102) indicating a number of traffic identifiers for which there is buffered traffic. In generating the first frame, the first device may set the number of traffic identifiers field to a second value (e.g., 0) indicating that the number of traffic identifiers for which there is buffered traffic is zero.

In some embodiments, the first frame may include a quality of service (QoS) control field (e.g., QoS control field 1200) that includes a first field (e.g., subfield 1204). In generating the first frame, the first device may set the first field (e.g., subfield 1204) to a value (e.g., 1) indicating presence of wireless peer-to-peer (p2p) traffic. The QoS control field includes a second field (e.g., subfield 1205). In generating the first frame, the first device may set the second field (e.g., subfield 1205) to a value indicating a queue size of the wireless traffic (e.g., p2p traffic 474) between the first device (e.g., device 470) and the second device (e.g., device 480).

In some embodiments, the first frame may include a control identifier field (e.g., control ID 1320). In generating the first frame, the first device may set the control identifier field to a value (e.g., value 7) indicating a peer-to-peer (p2p) buffer status report frame (see Table 2). The first frame may include a queue size field (e.g., queue size 1332). In generating the first frame, the first device may set the queue size field to a value indicating a queue size of the wireless traffic (e.g., p2p traffic 474) between the first device (e.g., device 470) and a second device (e.g., device 480).

In one approach, the first device may wirelessly transmit 1404, via a transceiver of the first device, the generated first frame to an access point (e.g., AP 460) in a wireless local area network (WLAN).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A first device comprising:

one or more processors configured to:

generate a first frame including buffer status data corresponding to wireless traffic between the first device and a second device, wherein each of the first device and the second device is not an access point; and wirelessly transmit, via a transceiver, the generated first frame to an access point in a wireless local area network (WLAN), wherein:

the first frame includes a quality of service (QoS) control field that includes a first field, and in generating the first frame, the one or more processors are configured to set the first field to a value indicating that the buffer status data included in the first frame relates to wireless peer-to-peer (p2p) traffic.

2. The first device according to claim 1, wherein the one or more processors are further configured to:

wirelessly receive, via the transceiver from the access point, a second frame; and in response to the second frame, generate the first frame.

3. The first device according to claim 1, wherein the wireless traffic comprises peer-to-peer (p2p) traffic between the first device and the second device.

4. The first device according to claim 1, wherein:

the first frame includes a control identifier field, and in generating the first frame, the one or more processors are configured to set the control identifier field to a value indicating a buffer status report frame.

5. The first device according to claim 1, wherein:

the first frame includes a bitmap field that includes a plurality of bits corresponding to a plurality of access categories, and in generating the first frame, the one or more processors are configured to set each of the plurality of bits to a first value indicating that there is no traffic associated with an access category corresponding to the bit.

6. The first device according to claim 5, wherein:

the first frame includes a number of traffic identifiers field indicating a number of traffic identifiers for which there is buffered traffic, and in generating the first frame, the one or more processors are configured to set the number of traffic identifiers field to a second value indicating that the number of traffic identifiers for which there is buffered traffic is zero.

7. The first device according to claim 1, wherein:

the QoS control field includes a second field, and in generating the first frame, the one or more processors are configured to set the second field to a value indicating a queue size of the wireless traffic between the first device and the second device.

8. The first device according to claim 1, wherein:

the first frame includes a control identifier field, and in generating the first frame, the one or more processors are configured to set the control identifier field to a value indicating a peer-to-peer (p2p) buffer status report frame.

9. The first device according to claim 8, wherein the first frame includes a queue size field, and in generating the first frame, the one or more processors are configured to set the queue size field to a value indicating a queue size of the wireless traffic between the first device and a second device.

10. A method comprising:

generating, by a first device, a first frame including buffer status data corresponding to wireless traffic between the first device and a second device, wherein each of the first device and the second device is not an access point; and wirelessly transmitting, via a transceiver of the first device, the generated first frame to an access point in a wireless local area network (WLAN), wherein:

the first frame includes a quality of service (QOS) control field that includes a first field, and generating the first frame comprises setting the first field to a value indicating that the buffer status data included in the first frame relates to wireless peer-to-peer (p2p) traffic.

11. The method according to claim 10, further comprising:

wirelessly receiving, via the transceiver from the access point, a second frame; and in response to the second frame, generating the first frame.

12. The method according to claim 10, wherein the wireless traffic comprises peer-to-peer (p2p) traffic between the first device and the second device.

13. The method according to claim 10, wherein:

the first frame includes a control identifier field, and generating the first frame comprises setting the control identifier field to a value indicating a buffer status report frame.

14. The method according to claim 10, wherein:

the first frame includes a bitmap field that includes a plurality of bits corresponding to a plurality of access categories, and generating the first frame comprises setting each of the plurality of bits to a first value indicating that there is no traffic associated with an access category corresponding to the bit.

15. The method according to claim 14, wherein:

the first frame includes a number of traffic identifiers field indicating a number of traffic identifiers for which there is buffered traffic, and generating the first frame comprises setting the number of traffic identifiers field to a second value indicating that the number of traffic identifiers for which there is buffered traffic is zero.

16. The method according to claim 10, wherein:

the QoS control field includes a second field, and generating the first frame comprises setting the second field to a value indicating a queue size of the wireless traffic between the first device and the second device.

17. The method according to claim 10, wherein:

the first frame includes a control identifier field, and generating the first frame comprises setting the control identifier field to a value indicating a peer-to-peer (p2p) buffer status report frame.

18. The method according to claim 17, wherein the first frame includes a queue size field, and generating the first frame comprises setting the queue size field to a value indicating a queue size of the wireless traffic between the first device and a second device.

* * * * *